US010403297B2

(12) United States Patent
Davis

(10) Patent No.: US 10,403,297 B2
(45) Date of Patent: Sep. 3, 2019

(54) METHODS AND APPARATUS FOR ADJUSTING A LEVEL OF AN AUDIO SIGNAL

(71) Applicant: Dolby Laboratories Licensing Corporation, San Francisco, CA (US)

(72) Inventor: Mark F. Davis, Pacifica, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 16/226,289

(22) Filed: Dec. 19, 2018

(65) Prior Publication Data

US 2019/0122683 A1 Apr. 25, 2019

Related U.S. Application Data

(60) Division of application No. 15/691,309, filed on Aug. 30, 2017, now Pat. No. 10,269,364, which is a (Continued)

(51) Int. Cl.
*G01L 19/00* (2006.01)
*G10L 19/06* (2013.01)
(Continued)

(52) U.S. Cl.
CPC ............ *G10L 19/06* (2013.01); *G10L 19/005* (2013.01); *G10L 19/008* (2013.01); (Continued)

(58) Field of Classification Search
CPC .............................. G10L 19/00; G10L 19/008
(Continued)

(56) References Cited

U.S. PATENT DOCUMENTS 1,124,580 A 1/1915 Amet
1,850,130 A 3/1932 Danforth
(Continued)

FOREIGN PATENT DOCUMENTS

CN 1130961 9/1996
EP 0372155 6/1990
(Continued)

OTHER PUBLICATIONS

Herre, et al., "Intensity Stereo Coding" presented at the 96th AES Convention Feb. 26-Mar. 1, 1994 Amsterdam.
(Continued)

*Primary Examiner* — Michael N Opsasnick

(57) ABSTRACT

A method performed in an audio decoder for decoding M encoded audio channels representing N audio channels is disclosed. The method includes receiving a bitstream containing the M encoded audio channels and a set of spatial parameters, decoding the M encoded audio channels, and extracting the set of spatial parameters from the bitstream. The method also includes analyzing the M audio channels to detect a location of a transient, decorrelating the M audio channels, and deriving N audio channels from the M audio channels and the set of spatial parameters. A first decorrelation technique is applied to a first subset of each audio channel and a second decorrelation technique is applied to a second subset of each audio channel. The first decorrelation technique represents a first mode of operation of a decorrelator, and the second decorrelation technique represents a second mode of operation of the decorrelator.

11 Claims, 11 Drawing Sheets

Related U.S. Application Data division of application No. 15/446,699, filed on Mar. 1, 2017, now Pat. No. 9,779,745, which is a continuation of application No. 15/344,137, filed on Nov. 4, 2016, now Pat. No. 9,640,188, which is a continuation of application No. 15/060,425, filed on Mar. 3, 2016, now Pat. No. 9,520,135, which is a division of application No. 14/614,672, filed on Feb. 5, 2015, now Pat. No. 9,311,922, which is a continuation of application No. 11/888,657, filed on Jul. 31, 2007, now Pat. No. 8,170,882, which is a continuation of application No. 10/591,374, filed as application No. PCT/US2005/006359 on Feb. 28, 2005, now Pat. No. 8,983,834.

(60) Provisional application No. 60/588,256, filed on Jul. 14, 2004, provisional application No. 60/579,974, filed on Jun. 14, 2004, provisional application No. 60/549,368, filed on Mar. 1, 2004.

(51) Int. Cl.

| | |
|---|---|
| ***G10L 19/025*** | (2013.01) |
| ***G10L 19/005*** | (2013.01) |
| ***G10L 19/008*** | (2013.01) |
| ***G10L 19/02*** | (2013.01) |
| ***G10L 19/018*** | (2013.01) |
| ***G10L 19/26*** | (2013.01) |
| *H04S 3/00* | (2006.01) |

(52) U.S. Cl.

CPC ............ *G10L 19/018* (2013.01); *G10L 19/02* (2013.01); *G10L 19/0204* (2013.01); *G10L 19/025* (2013.01); *G10L 19/26* (2013.01); *H04S 3/00* (2013.01); *H04S 3/008* (2013.01)

(58) Field of Classification Search

USPC ................................................. 704/500–504

See application file for complete search history.

(56) References Cited

U.S. PATENT DOCUMENTS 1,855,147 A 4/1932 Jones
2,114,680 A 4/1938 Goldsmith
2,819,342 A 1/1958 Becker
2,860,541 A 11/1958 Dresser
2,927,963 A 3/1960 Oakes
3,046,337 A 7/1962 Hornyak
3,067,292 A 12/1962 Minter
3,846,719 A 11/1974 Dolby
4,308,424 A 12/1981 Bice, Jr.
4,359,605 A 11/1982 Haramoto
4,464,784 A 8/1984 Agnello
4,624,009 A 11/1986 Glenn
4,799,260 A 1/1989 Mandell
4,922,535 A 5/1990 Dolby
4,932,059 A 6/1990 Fosgate
4,941,177 A 7/1990 Mandell
5,040,081 A 8/1991 McCutchen
5,046,098 A 9/1991 Mandell
5,105,462 A 4/1992 Lowe et al.
5,121,433 A 6/1992 Kendall et al.
5,164,840 A 11/1992 Kawamura et al.
5,172,415 A 12/1992 Fosgate
5,173,944 A 12/1992 Begault
5,235,646 A 8/1993 Wilde et al.
5,274,740 A 12/1993 Davis
5,394,472 A * 2/1995 Broadie .................. H04R 3/00 381/1
5,394,473 A 2/1995 Davidson
5,400,433 A 3/1995 Todd
5,428,687 A 6/1995 Willcocks et al.
5,463,424 A 10/1995 Dressler
5,472,689 A * 12/1995 Ito ........................... A61Q 5/06 424/70.122
5,504,819 A 4/1996 Fosgate
5,583,963 A 12/1996 Lozach
5,621,855 A 4/1997 Veldhuis et al.
5,625,696 A 4/1997 Fosgate
5,633,981 A 5/1997 Davis
5,644,640 A 7/1997 Fosgate
5,659,619 A * 8/1997 Abel ...................... H04S 1/002 381/1
5,727,119 A 3/1998 Davidson
5,742,689 A 4/1998 Tucker
5,857,026 A 1/1999 Scheiber
5,862,228 A 1/1999 Davis
5,870,480 A 2/1999 Griesinger
5,890,125 A * 3/1999 Davis ................... G01L 19/008 381/1
5,909,664 A 6/1999 Davis
5,956,674 A 9/1999 Smyth et al.
6,021,386 A 2/2000 Todd
RE36,714 E 5/2000 Brandenburg et al.
6,111,958 A 8/2000 Maher
6,211,919 B1 4/2001 Zink et al.
6,430,533 B1 8/2002 Kolluru et al.
6,487,535 B1 11/2002 Smyth et al.
6,498,857 B1 12/2002 Sibbald
6,529,604 B1 3/2003 Park
6,658,117 B2 * 12/2003 Hasebe ................. G10K 15/12 381/18
6,807,528 B1 10/2004 Truman
6,925,434 B2 8/2005 Oomen et al.
6,931,370 B1 * 8/2005 McDowell ............. H04S 3/008 704/200.1
7,006,636 B2 2/2006 Baumgarte et al.
7,184,556 B1 2/2007 Johnson
7,240,001 B2 * 7/2007 Chen ...................... G10L 19/02 375/340
7,257,231 B1 8/2007 Avendano et al.
7,283,954 B2 10/2007 Crockett
7,292,901 B2 11/2007 Baumgarte
7,313,519 B2 12/2007 Crockett
7,382,888 B2 6/2008 Aylward et al.
7,394,903 B2 7/2008 Herre et al.
7,412,380 B1 8/2008 Avendano et al.
7,428,440 B2 9/2008 Schildbach
7,447,317 B2 11/2008 Herre et al.
7,454,331 B2 11/2008 Vinton
7,461,002 B2 12/2008 Crockett
7,508,947 B2 3/2009 Smithers
7,519,538 B2 4/2009 Villemoes
7,536,305 B2 * 5/2009 Chen .................. G10L 19/0017 704/219
7,542,896 B2 6/2009 Schuijers et al.
7,567,845 B1 7/2009 Avendano et al.
7,583,805 B2 9/2009 Baumgarte et al.
7,610,205 B2 10/2009 Crockett
7,639,823 B2 * 12/2009 Baumgarte ........... H03G 5/165 381/107
7,644,003 B2 * 1/2010 Baumgarte ........... G10L 19/008 375/242
7,660,424 B2 * 2/2010 Davis ..................... H04S 5/005 381/17
7,711,123 B2 5/2010 Crockett
7,916,873 B2 3/2011 Villemoes
7,933,415 B2 4/2011 Breebaart
7,974,847 B2 7/2011 Villemoes
8,019,350 B2 9/2011 Purnhagen
8,983,834 B2 3/2015 Davis
9,311,922 B2 * 4/2016 Davis .................... G10L 19/008
9,454,969 B2 * 9/2016 Davis .................... G10L 19/008
9,520,135 B2 * 12/2016 Davis .................... G10L 19/008
9,640,188 B2 * 5/2017 Davis .................... G10L 19/008
9,672,839 B1 * 6/2017 Davis .................... G10L 19/008
9,691,404 B2 * 6/2017 Davis .................... G10L 19/008
9,691,405 B1 * 6/2017 Davis .................... G10L 19/008
9,697,842 B1 * 7/2017 Davis .................... G10L 19/008
9,704,499 B1 * 7/2017 Davis .................... G10L 19/008

(56) References Cited

U.S. PATENT DOCUMENTS

| | | | | |
|---|---|---|---|---|
| 9,751,882 | B2 * | 9/2017 | Liu | C07D 455/03 |
| 9,779,745 | B2 * | 10/2017 | Davis | G10L 19/008 |
| 2001/0027393 | A1 | 10/2001 | Touimi | |
| 2001/0032087 | A1 | 10/2001 | Oomen | |
| 2001/0038643 | A1 | 11/2001 | McParland | |
| 2002/0054685 | A1 * | 5/2002 | Avendano | H04M 9/082 381/66 |
| 2002/0154783 | A1 | 10/2002 | Fincham | |
| 2003/0035553 | A1 | 2/2003 | Baumgarte | |
| 2003/0219130 | A1 | 11/2003 | Baumgarte | |
| 2003/0231774 | A1 | 12/2003 | Schildbach | |
| 2003/0236583 | A1 * | 12/2003 | Baumgarte | G10L 19/008 700/94 |
| 2004/0002862 | A1 | 1/2004 | Kim | |
| 2004/0032960 | A1 | 2/2004 | Griesinger | |
| 2004/0037421 | A1 | 2/2004 | Truman | |
| 2004/0044520 | A1 * | 3/2004 | Chen | G10L 19/0017 704/200.1 |
| 2004/0125960 | A1 | 7/2004 | Fosgate | |
| 2004/0175006 | A1 | 9/2004 | Kim | |
| 2004/0184537 | A1 | 9/2004 | Geiger | |
| 2005/0058304 | A1 | 3/2005 | Baumgarte | |
| 2005/0074127 | A1 | 4/2005 | Herre | |
| 2005/0078832 | A1 | 4/2005 | Van De Par | |
| 2005/0078840 | A1 | 4/2005 | Riedl | |
| 2005/0157883 | A1 | 7/2005 | Herre | |
| 2005/0180579 | A1 | 8/2005 | Baumgarte | |
| 2005/0254446 | A1 | 11/2005 | Breebaart | |
| 2006/0002572 | A1 | 1/2006 | Smithers | |
| 2007/0165869 | A1 * | 7/2007 | Ojanpera | G10L 19/008 381/23 |
| 2008/0170711 | A1 | 7/2008 | Breebaart | |
| 2009/0208023 | A9 * | 8/2009 | Davis | H04S 5/005 381/20 |
| 2017/0365268 | A1 * | 12/2017 | Davis | G10L 19/008 |

FOREIGN PATENT DOCUMENTS

| | | |
|---|---|---|
| EP | 0525544 | 2/1993 |
| EP | 1349386 | 10/2003 |
| EP | 1484841 | 12/2004 |
| EP | 1479071 | 1/2006 |
| EP | 1 914 722 | 4/2008 |
| EP | 2 065 885 | 6/2009 |
| EP | 2 224 430 | 9/2010 |
| JP | 10074097 | 3/1998 |
| TW | 526467 | 4/2003 |
| TW | 200400488 | 1/2004 |
| TW | 200501056 | 1/2005 |
| WO | 91/19989 | 12/1991 |
| WO | 91/20164 | 12/1991 |
| WO | 98/20482 | 5/1998 |
| WO | 99/29114 | 7/1999 |
| WO | 00/19414 | 4/2000 |
| WO | 00/45378 | 8/2000 |
| WO | 00/60746 | 10/2000 |
| WO | 01/35389 | 5/2001 |
| WO | 2001/41504 | 6/2001 |
| WO | 2001/041505 | 6/2001 |
| WO | 02/15587 | 2/2002 |
| WO | 2002/019768 | 3/2002 |
| WO | 2002/063925 | 8/2002 |
| WO | 02/097791 | 12/2002 |
| WO | 2002/097792 | 12/2002 |
| WO | 03/069954 | 8/2003 |
| WO | 03/090208 | 10/2003 |
| WO | 2003/069954 | 11/2003 |
| WO | 2004/008806 | 1/2004 |
| WO | 2004/019656 | 3/2004 |
| WO | 2004/073178 | 8/2004 |
| WO | 2004/111994 | 12/2004 |
| WO | 2006/006977 | 1/2006 |
| WO | 2006/113047 | 10/2006 |
| WO | 2006/113062 | 10/2006 |
| WO | 2006/132857 | 12/2006 |
| WO | 2007/016107 | 2/2007 |
| WO | 2007/109338 | 9/2007 |
| WO | 2007/127023 | 11/2007 |

OTHER PUBLICATIONS

Liu, et al., "Design of the Coupling Schemes for the AC-3 Coder in Stereo Coding" IEEE Transactions on Consumer Electronics, vol. 44, No. 3, Aug. 1998, pp. 878-882.

Baumgarte, et al., "Binaural Cue Coding—Part I: Psychoacoustic Fundamentals and Design Principles" IEEE Transactiions on Speech and Audio Processing, vol. II, No. 6, Nov. 2003, pp. 509-519.

Johnston, et al., "MPEG-2 NBC Audio-Stereo and Multichannel Coding Methods" presented at the 101st Convention Nov. 8-11, 1996, Los Angeles, California.

ATSC Standard A52/A: Digital Audio Compression Standard (AC-3), Revision A, Advanced Television Systems Committee, Aug. 20, 2001.

ATSC Standard: Digital Audio Compression (AC-3), Revision A, Doc A/52A, ATSC Standard, Aug. 20, 2001, pp. 1-140.

Avendano et al. "Frequency Domain Techniques for Stereo to Multichannel UPMIX" 22nd International Conference: Virtual, Synthetic, and Entertainment Audio, Jun. 2002.

Baumgarte et al. "Binaural Cue Coding—Part I: Psychoacoustic Fundamentals and Design Principles" 2003.

Baumgarte, et al., "Estimation of Auditory Spatial Cues for Binaural Cue Coding," 2002, IEEE, pp. II-1801-II-1804.

Baumgarte, et al., "Why Binaural Cue Coding is Better Than Intensity Stereo Coding," May 1-13, 2002, Presented at the 112th AES Convention , Munich, Germany.

Blesser, B., "An Ultraminiature Console Compression System with Maximum User Flexibility", presented Oct. 8, 1971 at the 41st Convention of the Audio Engineering Society, New York, AES May 1972 vol. 20, No. 4, pp. 297-302.

Boueri, et al., "Audio Signal Decorrelation Based on a Critical Band Approach", AES Convention Paper 6291, presented at the 117th Convention Oct. 28-31, 2004 San Francisco, CA.

Brandenburg et al. "Overview of MPEG Audio: Current and Future Standards for Low-Bit-Rate Audio Coding" 1997.

Brandenburg, K., "MP3 and AAC Explained," Proceedings of the International AES Conference, 1999, pp. 99-110.

Breebaart, et al., "High-Quality Parametric Spatial Audio Coding at Low Bitrates", AES Convention Paper 6072, presented at the 116th Convention May 8-11, 2004 Berlin, Germany.

C. Faller and F. Baumgarte, "Binaural cue coding—Part II: Schemes and applications," IEEE Trans. Speech Audio Processing, vol. 11, pp. 520-531, Nov. 2003.

Carroll, Tim, "Audio Metadata: You Can Get There from Here," Oct. 11, 2004, pp. 1-4, Retrieved from the Internet: URL:http://tvtechnology.com/features/audio.sub.--notes/f-TC-metadta-8.21.-02.shtml.

Edmonds, et al., "Automatic Feature Extraction from Spectrograms for Acoustic-Phonetic Analysis", Lutchi Research Center, Loughborough Univ. of Technology, Loughborough, U.K., pp. 701-704.

Edmonds, et al., "Automatic Feature Extraction from Spectrograms for Acoustic-Phonetic Analysis", pp. 701-704, Lutchi Research Center, Loughborough University of Technology, Loughborough, U.K. Issue Date: Aug. 30-Sep. 3, 1992.

Engdegard, et al., "Synthetic Ambience in Parametric Stereo Coding", AES Convention Paper 6074, presented at the 116th Convention May 8-11, 2004 Berlin, Germany.

Faller et al. "Binaural Cue Coding Applied to Audio Compression with Flexible Rendering" 2002.

Faller et al. "Binaural Cue Coding Applied to Stereo and Multi-Channel Audio Compression" 2002.

Faller et al. "Efficient Representation of Spatial Audio Using Perceptual Parametrization" 2001.

Faller, Christof, "Coding of Spatial Audio Compatible with Different Playback Formats," Audio Engineering Society Convention Paper, presented at the 117.sup.th Convention, pp. 1-12, Oct. 28-31, 2004 San Francisco, CA.

(56) References Cited

OTHER PUBLICATIONS

Faller, Christof, "Parametric Coding of Spatial Audio," These No. 3062, pp. 1-164, (2004) Lausanne, EPFL.
Faller, et al., "Binaural Cue Coding Applied to Stereo and Multi-Channel Audio Compression," May 10-13, 2002, presented at the 112th AES Convention, Munich, Germany.
Faller, et al., "Binaural Cue Coding: A Novel and Efficient Representation of Spatial Audio," 2002, IEEE, pp. II-1841-II-1844.
Faller, et al., "Efficient Representation of Spatial Audio Using Perceptual Parametrization," Oct. 21-24, 2001, IEEE Workshop on Applications of Signal Processing to Audio and Acoustics, pp. 199-202.
Fielder, et al., "Introduction to Dolby Digital Plus, an Enhancement to the Dolby Digital Coding System," Audio Engineering Society Convention Paper, presented at the 117.sup.th Convention, pp. 1-29, Oct. 28-31, 2004, San Francisco, CA.
Fishbach, Alon, Primary Segmentation of Auditory Scenes, IEEE, pp. 113-117, 1994.
Foti, Frank, "DTV Audio Processing: Exploring the New Frontier," OMNIA, Nov. 1998, pp. 1-3.
Glasberg, B. R., et al., "A Model of Loudness Applicable to Time-Varying Sounds," Audio Engineering Society, New York, NY, vol. 50, No. 5, May 2002, pp. 331-342.
Hauenstein, M., "A Computationally Efficient Algorithm for Calculating Loudness Patterns of Narrowband Speech," Acoustics, Speech and Signal Processing, 1997, IEEE International Conference, Munich, Germany, Apr. 21-24, 1997, Los Alamitos, CA USE, IEEE Comput. Soc. US Apr. 21, 1997, pp. 1311-1314.
Schroeder, et al., "Colorless Artificial Reverberation," 1961, IRE Transactions on Audio, vol. AU-9, pp. 209-214.
Herre, et al., "MP3 Surround: Efficient and Compatible Coding of Multi-Channel Audio," Audio Engineering Society Convention Paper, presented at the 116.sup.th Convention, pp. 1-14, May 8-11, 2004 Berlin, Germany.
Herre, et al., "Spatial Audio Coding: Next-Generation Efficient and Compatible Coding of Multi-Channel Audio," Audio Engineering Society Convention Paper, presented at the 117.sup.th Convention, pp. 1-13, Oct. 28-31, 2004 San Francisco, CA.
Herre, et al., "The Reference Model Architecture for MPEG Spatial Audio Coding," Audio Engineering Society Convention Paper, presented at the 118.sup.th Convention, pp. 1-13, May 28-31, 2005 Barcelona, Spain.
Hoeg, W., et al., "Dynamic Range Control (DRC) and Music/Speech Control (MSC) Programme-Associated Data Services for DAB", EBU Review—Technical, European Broadcasting Union, Brussels, BE, No. 261, Sep. 21, 1994, pp. 56-70.
Kendall. "The Decorrelation of Audio Signals and Its Impact on Spatial Imagery" 1995.
Laroche, Jean, "Autocorrelation Method for High-Quality Time/Pitch-Scaling," Telecom Paris, Departement Signal, 75634 Paris Cedex 13. France, email: laroche@sig.enst.fr.
Moore B. C. J. et al., "A Model for the Prediction of Thresholds, Loudness and Partial Loudness," Journal of the Audio Engineering Society, New York, NY vol. 45, No. 4, Apr. 1, 1997, pp. 224-240.
Painter, T., et al., "Perceptual Coding of Digital Audio", Proceedings of the IEEE, New York, NY, vol. 88, No. 4, Apr. 2000, pp. 451-513.
Percival, W. S., "A Compressed-Bandwidth Stereophonic System for Radio Transmission," IEEE Paper No. 3152 E, Nov. 1959.
Princen, et al., "Subband/Transform Coding Using Filter Bank Designs on Time Domain Aliasing Cancellation," Proc. Int. Conf. Acoust., Speech, and Signal Proc., May 1987, pp. 2161-2164.
Riedmiller Jeffrey C., "Solving TV Loudness Problems Can You 'Accurately' Hear the Difference," Communications Technology, Feb. 2004.
Schroeder, M. R., "Natural Sounding Artificial Reverberation," Jul. 1962, Journal AES, vol. 10, No. 2, pp. 219-223.
Schuijers et al. "Advances in Parametric Coding for High-Quality Audio" Mar. 2003.
Schuijers, E., et al.; "Advances in Parametric Coding for High-Quality Audio," Preprints of Papers Presented at the AES Convention, Mar. 22, 2003, pp. 1-11, Amsterdam, The Netherlands.
Schuijers, et al., "Low Complexity Parametric Stereo Coding", AES Convention Paper 6073, presented at the 116th Convention May 8-11, 2004, Berlin, Germany.
Schuijers, et al., "Low Complexity Parametric Stereo Coding," Audio Engineering Society Convention Paper, presented at the 116.sup.th Convention, pp. 1-11, May 8-11, 2004 Berlin, Germany.
Shimada, et al., "A Low Power SBR Algorithm for the MPEG-4 Audio Standard and its DSP Implementation", AES Convention Paper 6048, presented at the 116th Convention May 8-11, 2004, Berlin, Germany.
Smith, et al., "Tandem-Free VoIP Conferencing: A Bridge to Next-Generation Networks," IEEE Communications Magazine, May 2003, pp. 136-145.
Swanson, M. D., et al., "Multiresolution Video Watermarking Using Perceptual Models and Scene Segmentation," Proceedings of the International Conference on Image Processing, Santa Barbara, Ca, Oct. 26-29, 1997, Los Alamitos, CA IEEE Computer Society, US, vol. 2, Oct. 1997, pp. 558-561.
Todd, et al., "AC-3: Flexible Perceptual Coding for Audio Transmission and Storage," 96.sup.th Convention of the Audio Engineering Society, Preprint 3796, Feb. 1994, pp. 1-16.
Todd, et al., "AC-3: Flexible Perceptual Coding for Audio Transmission and Storage," Feb. 26-Mar. 1, 1994, presented at the 96th AES Convention as Preprint 3796.
Trappe, W., et al., "Key Distribution fro Secure Multimedia Multicasts via Data Embedding," 2001 IEEE International Conferences on Acoustics, Speech and Signal Processing Proceedings, Salt Lake City UT, May 7-11, 2001 IEEE international Conference on Acoustics, Speech and Signal Processing, New York, NY, IEEE, US, vol. 1 of 6, May 7, 2001, pp. 1449-1452.
Vafin, et al., "Improved Modeling of Audio Signals by Modifying Transient Locations", Oct. 21-24, 2001, New Paltz, New York, pp. W2001-W2001-4.
Vafin, et al., "Improved Modeling of Audio Signals by Modifying Transient Locations," pp. W2001-W2001-4, Oct. 21-24, 2001, New Paltz, New York. cited by other.
Vafin, et al., "Modifying Transients for Efficient Coding of Audio", IEEE, pp. 3285-3288, Apr. 2001.
Cheng, C. "Introduction to Head-Related Transfer Functions (HRTFs): Representations of HRTFs in Time, Frequency, and Space" presented at the 107th Convention, Sep. 24-27, 1999, New York, AES.
Vernon, Steve, "Design and Implementation of AC-3 Coders," reprinted by permission of IEEE, published in IEEE Tr. Consumer Electronics, vol. 41, No. 3, Aug. 1995.
Herre et al. "Intensity Stereo Coding" 1994.

* cited by examiner

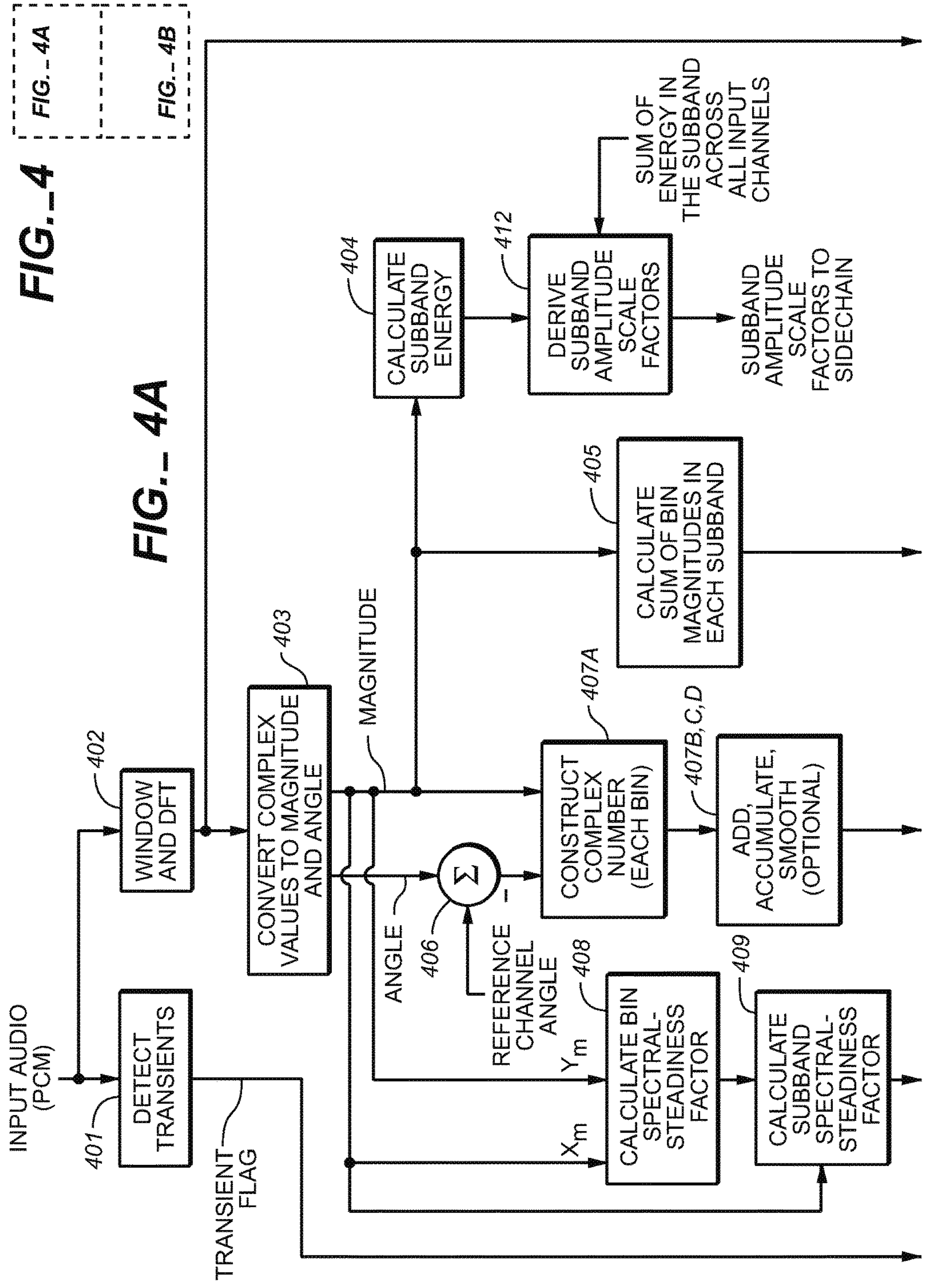
FIG._4
FIG._4A
FIG._4B
FIG._4A
INPUT AUDIO (PCM)
401
DETECT TRANSIENTS
TRANSIENT FLAG
402
WINDOW AND DFT
403
CONVERT COMPLEX VALUES TO MAGNITUDE AND ANGLE
MAGNITUDE
ANGLE
406
Σ
REFERENCE CHANNEL ANGLE
404
CALCULATE SUBBAND ENERGY
412
DERIVE SUBBAND AMPLITUDE SCALE FACTORS
SUM OF ENERGY IN THE SUBBAND ACROSS ALL INPUT CHANNELS
SUBBAND AMPLITUDE SCALE FACTORS TO SIDECHAIN
405
CALCULATE SUM OF BIN MAGNITUDES IN EACH SUBBAND
407A
CONSTRUCT COMPLEX NUMBER (EACH BIN)
407B, C, D
ADD, ACCUMULATE, SMOOTH (OPTIONAL)
408
$Y_m$
$X_m$
CALCULATE BIN SPECTRAL-STEADINESS FACTOR
409
CALCULATE SUBBAND SPECTRAL-STEADINESS FACTOR

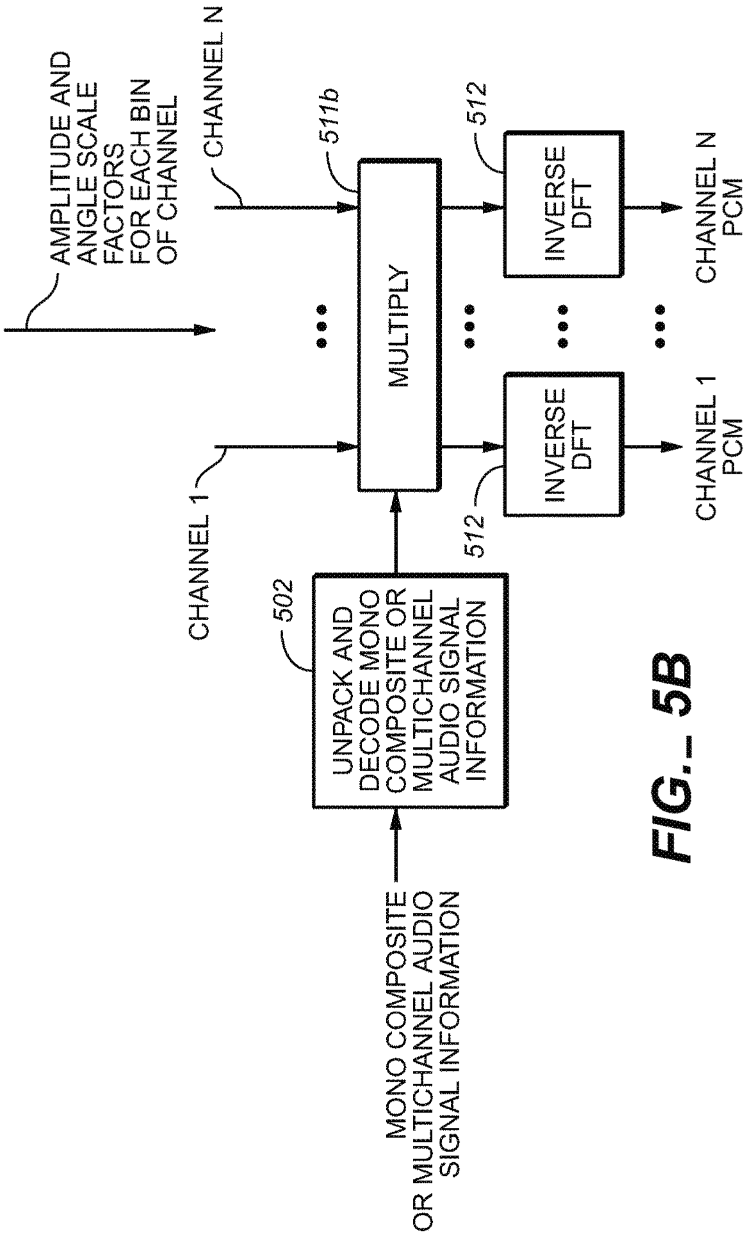
FIG._5B
FIG._5
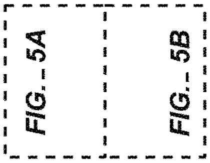

METHODS AND APPARATUS FOR ADJUSTING A LEVEL OF AN AUDIO SIGNAL

CROSS-REFERENCE TO RELATED APPLICATIONS

This application is a divisional U.S. patent application Ser. No. 15/691,309, filed on Aug. 30, 2017, which is a divisional U.S. patent application Ser. No. 15/446,699, filed on Mar. 1, 2017 which is issued as U.S. Pat. No. 9,779,745 on Oct. 3, 2017, which is continuation U.S. patent application Ser. No. 15/344,137, filed on Nov. 4, 2016, which is issued as U.S. Pat. No. 9,640,188 on May 2, 2017, which is a continuation U.S. Ser. No. 15/060,425, filed Mar. 3, 2016, which is issued as U.S. Pat. No. 9,520,135 on Dec. 13, 2016, which is a divisional of U.S. patent application Ser. No. 14/614,672, filed Feb. 5, 2015, which is issued as U.S. Pat. No. 9,311,922 on Apr. 12, 2016, which is a continuation of U.S. Ser. No. 11/888,657 filed Jul. 31, 2007, which is issued as U.S. Pat. No. 8,170,882 on May 1, 2012, which is a continuation of U.S. patent application Ser. No. 10/591,374, filed Aug. 31, 2006, which issued as U.S. Pat. No. 8,983,834 on Mar. 17, 2015, which is a National Phase entry of PCT Patent Application No. PCT/US2005/006359, filed Feb. 28, 2005, which claims priority to U.S. Provisional Patent Application No. 60/588,256, filed Jul. 14, 2004, U.S. Provisional Patent Application No. 60/579,974, filed Jun. 14, 2004, and U.S. Provisional Patent Application No. 60/549,368, filed Mar. 1, 2004. The contents of all of the above applications are incorporated by reference in their entirety for all purposes.

TECHNICAL FIELD

The invention relates generally to audio signal processing. The invention is particularly useful in low bitrate and very low bitrate audio signal processing. More particularly, aspects of the invention relate to an encoder (or encoding process), a decoder (or decoding processes), and to an encode/decode system (or encoding/decoding process) for audio signals in which a plurality of audio channels is represented by a composite monophonic ("mono") audio channel and auxiliary ("sidechain") information. Alternatively, the plurality of audio channels is represented by a plurality of audio channels and sidechain information. Aspects of the invention also relate to a multichannel to composite monophonic channel downmixer (or downmix process), to a monophonic channel to multichannel upmixer (or upmixer process), and to a monophonic channel to multichannel decorrelator (or decorrelation process). Other aspects of the invention relate to a multichannel-to-multichannel downmixer (or downmix process), to a multichannel-to-multichannel upmixer (or upmix process), and to a decorrelator (or decorrelation process).

BACKGROUND ART

In the AC-3 digital audio encoding and decoding system, channels may be selectively combined or "coupled" at high frequencies when the system becomes starved for bits. Details of the AC-3 system are well known in the art—see, for example: *ATSC Standard A52/A: Digital Audio Compression Standard* (*AC*-3), *Revision A*, Advanced Television Systems Committee, 20 Aug. 2001. The A/52A document is available on the World Wide Web at http://www.atsc.org/stanards.html. The A/52A document is hereby incorporated by reference in its entirety.

The frequency above which the AC-3 system combines channels on demand is referred to as the "coupling" frequency. Above the coupling frequency, the coupled channels are combined into a "coupling" or composite channel. The encoder generates "coupling coordinates" (amplitude scale factors) for each subband above the coupling frequency in each channel. The coupling coordinates indicate the ratio of the original energy of each coupled channel subband to the energy of the corresponding subband in the composite channel. Below the coupling frequency, channels are encoded discretely. The phase polarity of a coupled channel's subband may be reversed before the channel is combined with one or more other coupled channels in order to reduce out-of-phase signal component cancellation. The composite channel along with sidechain information that includes, on a per-subband basis, the coupling coordinates and whether the channel's phase is inverted, are sent to the decoder. In practice, the coupling frequencies employed in commercial embodiments of the AC-3 system have ranged from about 10 kHz to about 3500 Hz. U.S. Pat. Nos. 5,583,962; 5,633,981, 5,727,119, 5,909,664, and 6,021,386 include teachings that relate to the combining of multiple audio channels into a composite channel and auxiliary or sidechain information and the recovery therefrom of an approximation to the original multiple channels. Each of said patents is hereby incorporated by reference in its entirety.

DISCLOSURE OF THE INVENTION

Aspects of the present invention may be viewed as improvements upon the "coupling" techniques of the AC-3 encoding and decoding system and also upon other techniques in which multiple channels of audio are combined either to a monophonic composite signal or to multiple channels of audio along with related auxiliary information and from which multiple channels of audio are reconstructed. Aspects of the present invention also may be viewed as improvements upon techniques for downmixing multiple audio channels to a monophonic audio signal or to multiple audio channels and for decorrelating multiple audio channels derived from a monophonic audio channel or from multiple audio channels.

Aspects of the invention may be employed in an N:1:N spatial audio coding technique (where "N" is the number of audio channels) or an M:1:N spatial audio coding technique (where "M" is the number of encoded audio channels and "N" is the number of decoded audio channels) that improve on channel coupling, by providing, among other things, improved phase compensation, decorrelation mechanisms, and signal-dependent variable time-constants. Aspects of the present invention may also be employed in N:x:N and M:x:N spatial audio coding techniques wherein "x" may be 1 or greater than 1. Goals include the reduction of coupling cancellation artifacts in the encode process by adjusting relative interchannel phase before downmixing, and improving the spatial dimensionality of the reproduced signal by restoring the phase angles and degrees of decorrelation in the decoder. Aspects of the invention when embodied in practical embodiments should allow for continuous rather than on-demand channel coupling and lower coupling frequencies than, for example in the AC-3 system, thereby reducing the required data rate.

In some aspects of the present invention, a method performed in an audio decoder for decoding M encoded audio channels representing N audio channels is disclosed. The method includes receiving a bitstream containing the M encoded audio channels and a set of spatial parameters, decoding the M encoded audio channels, and extracting the set of spatial parameters from the bitstream. The set of spatial parameters includes an amplitude parameter, a correlation parameter, and/or a phase parameter. The method also includes analyzing the M audio channels to detect a location of a transient, decorrelating the M audio channels, and deriving N audio channels from the M audio channels, the decorrelated channels, and the set of spatial parameters. The location of the transient may be detected based on a filtering operation. A first decorrelation technique is applied to a first subset of each audio channel and a second decorrelation technique is applied to a second subset of each audio channel. The first decorrelation technique represents a first mode of operation of a decorrelator, and the second decorrelation technique represents a second mode of operation of the decorrelator. The first mode of operation may use an all-pass filter (a component of a Schroeder-type reverberator) and the second mode of operation may use a fixed delay to achieve the decorrelation. In this embodiment, N is two or more, M is one or more, and M is less than N. Both the analyzing and the decorrelating are preferably performed in a frequency domain.

BEST MODE FOR CARRYING OUT THE INVENTION

Basic N:1 Encoder

Figure 1:
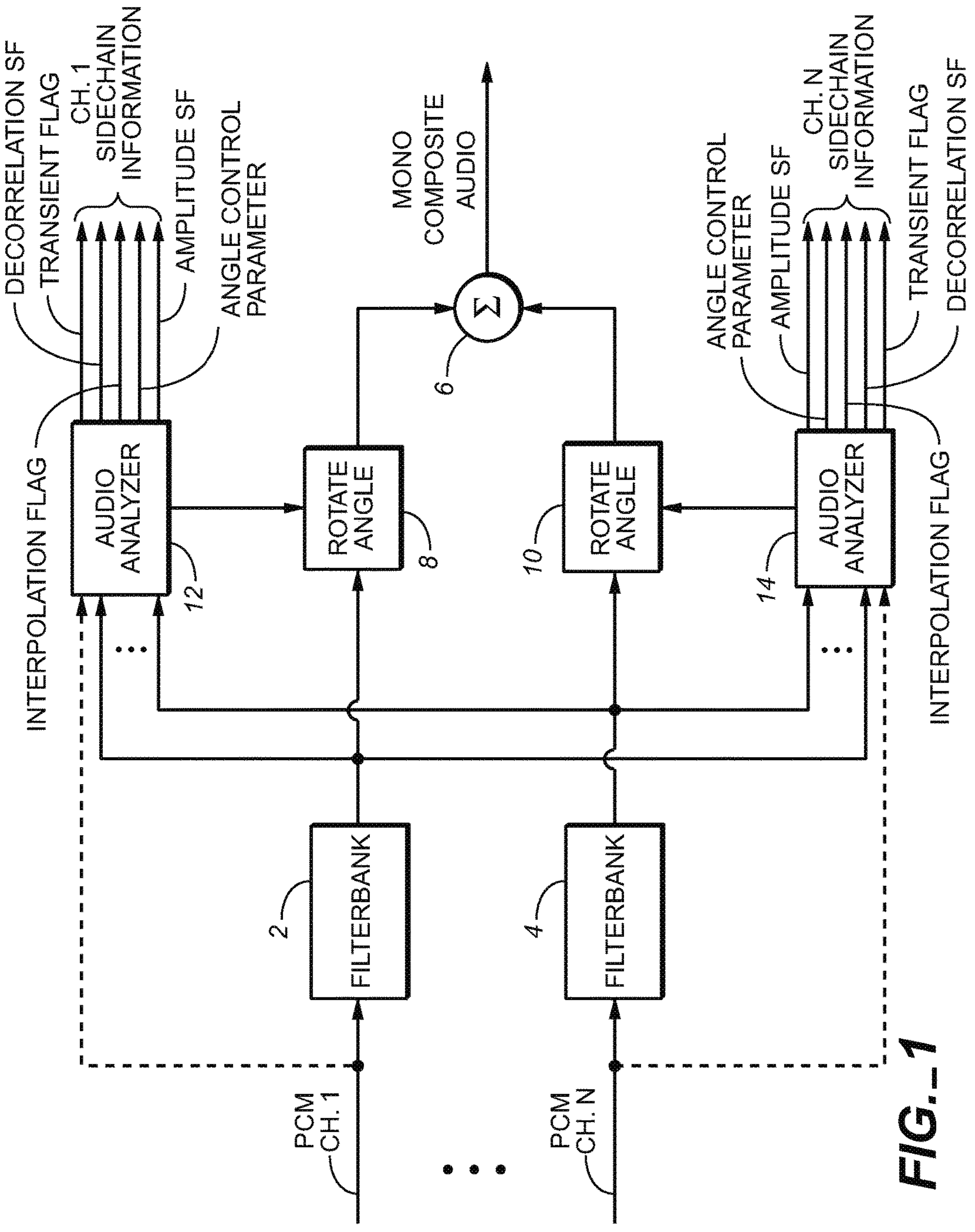
FIG. 1 is an idealized block diagram showing the principal functions or devices of an N:1 encoding arrangement embodying aspects of the present invention.

Referring to FIG. 1, an N:1 encoder function or device embodying aspects of the present invention is shown. The figure is an example of a function or structure that performs as a basic encoder embodying aspects of the invention. Other functional or structural arrangements that practice aspects of the invention may be employed, including alternative and/or equivalent functional or structural arrangements described below.

Two or more audio input channels are applied to the encoder. Although, in principle, aspects of the invention may be practiced by analog, digital or hybrid analog/digital embodiments, examples disclosed herein are digital embodiments. Thus, the input signals may be time samples that may have been derived from analog audio signals. The time samples may be encoded as linear pulse-code modulation (PCM) signals. Each linear PCM audio input channel is processed by a filterbank function or device having both an in-phase and a quadrature output, such as a 512-point windowed forward discrete Fourier transform (DFT) (as implemented by a Fast Fourier Transform (FFT)). The filterbank may be considered to be a time-domain to frequency-domain transform.

FIG. 1 shows a first PCM channel input (channel "1") applied to a filterbank function or device, "Filterbank" 2, and a second PCM channel input (channel "n") applied, respectively, to another filterbank function or device, "Filterbank" 4. There may be "n" input channels, where "n" is a whole positive integer equal to two or more. Thus, there also are "n" Filterbanks, each receiving a unique one of the "n" input channels. For simplicity in presentation, FIG. 1 shows only two input channels, "1" and "n".

When a Filterbank is implemented by an FFT, input time-domain signals are segmented into consecutive blocks and are usually processed in overlapping blocks. The FFT's discrete frequency outputs (transform coefficients) are referred to as bins, each having a complex value with real and imaginary parts corresponding, respectively, to in-phase and quadrature components. Contiguous transform bins may be grouped into subbands approximating critical bandwidths of the human ear, and most sidechain information produced by the encoder, as will be described, may be calculated and transmitted on a per-subband basis in order to minimize processing resources and to reduce the bitrate. Multiple successive time-domain blocks may be grouped into frames, with individual block values averaged or otherwise combined or accumulated across each frame, to minimize the sidechain data rate. In examples described herein, each filterbank is implemented by an FFT, contiguous transform bins are grouped into subbands, blocks are grouped into frames and sidechain data is sent on a once per-frame basis. Alternatively, sidechain data may be sent on a more than once per frame basis (e.g., once per block). See, for example, FIG. 3 and its description, hereinafter. As is well known, there is a tradeoff between the frequency at which sidechain information is sent and the required bitrate.

A suitable practical implementation of aspects of the present invention may employ fixed length frames of about 32 milliseconds when a 48 kHz sampling rate is employed, each frame having six blocks at intervals of about 5.3 milliseconds each (employing, for example, blocks having a duration of about 10.6 milliseconds with a 50% overlap). However, neither such timings nor the employment of fixed length frames nor their division into a fixed number of blocks is critical to practicing aspects of the invention provided that information described herein as being sent on a per-frame basis is sent no less frequently than about every 40 milliseconds. Frames may be of arbitrary size and their size may vary dynamically. Variable block lengths may be employed as in the AC-3 system cited above. It is with that understanding that reference is made herein to “frames” and “blocks.”

In practice, if the composite mono or multichannel signal(s), or the composite mono or multichannel signal(s) and discrete low-frequency channels, are encoded, as for example by a perceptual coder, as described below, it is convenient to employ the same frame and block configuration as employed in the perceptual coder. Moreover, if the coder employs variable block lengths such that there is, from time to time, a switching from one block length to another, it would be desirable if one or more of the sidechain information as described herein is updated when such a block switch occurs. In order to minimize the increase in data overhead upon the updating of sidechain information upon the occurrence of such a switch, the frequency resolution of the updated sidechain information may be reduced.

Figure 3:
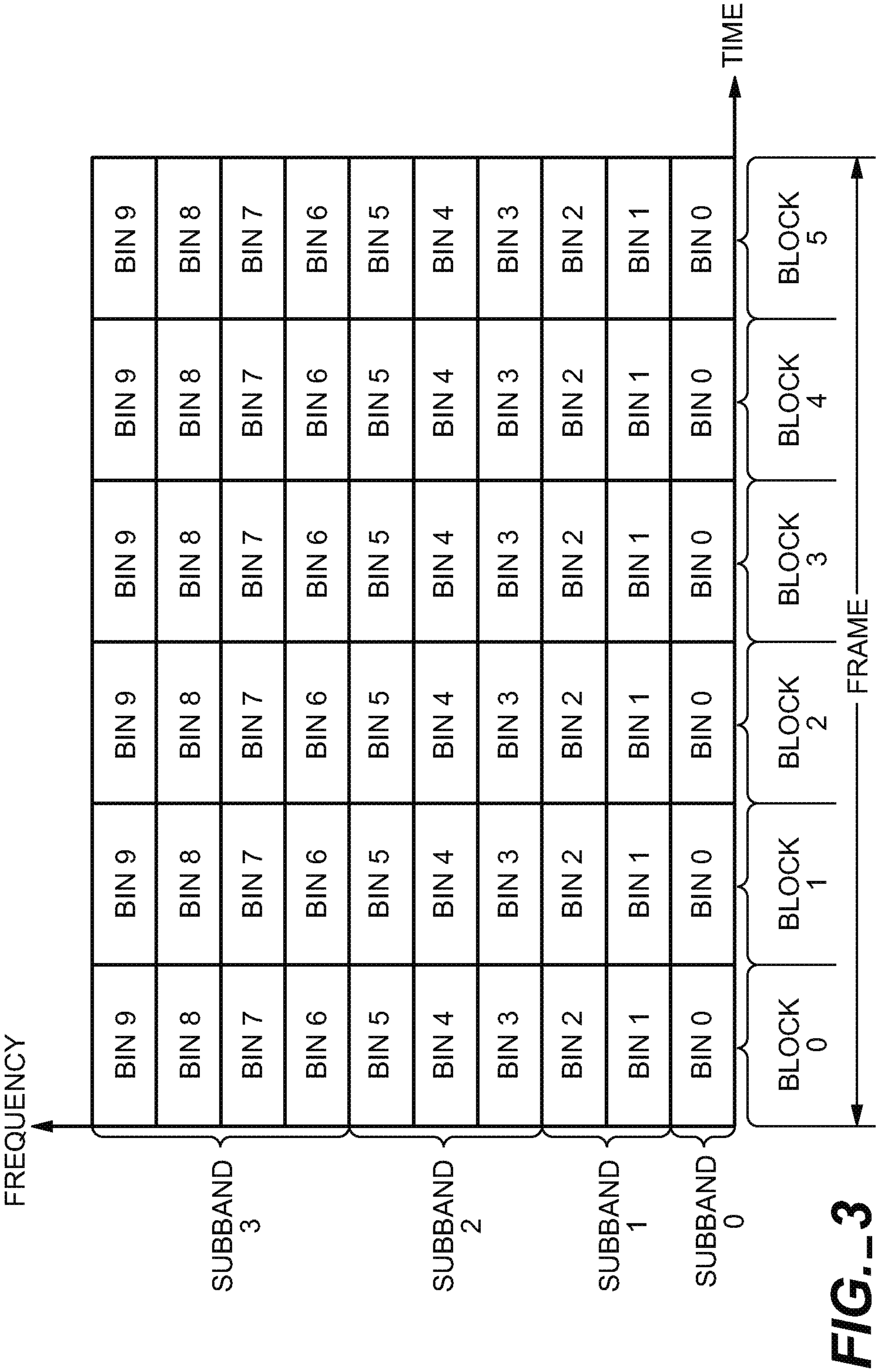
FIG. 3 shows an example of a simplified conceptual organization of bins and subbands along a (vertical) frequency axis and blocks and a frame along a (horizontal) time axis. The figure is not to scale.

FIG. 3 shows an example of a simplified conceptual organization of bins and subbands along a (vertical) frequency axis and blocks and a frame along a (horizontal) time axis. When bins are divided into subbands that approximate critical bands, the lowest frequency subbands have the fewest bins (e.g., one) and the number of bins per subband increase with increasing frequency.

Returning to FIG. 1, a frequency-domain version of each of the n time-domain input channels, produced by the each channel’s respective Filterbank (Filterbanks 2 and 4 in this example) are summed together (“downmixed”) to a monophonic (“mono”) composite audio signal by an additive combining function or device “Additive Combiner” 6.

The downmixing may be applied to the entire frequency bandwidth of the input audio signals or, optionally, it may be limited to frequencies above a given “coupling” frequency, inasmuch as artifacts of the downmixing process may become more audible at middle to low frequencies. In such cases, the channels may be conveyed discretely below the coupling frequency. This strategy may be desirable even if processing artifacts are not an issue, in that mid/low frequency subbands constructed by grouping transform bins into critical-band-like subbands (size roughly proportional to frequency) tend to have a small number of transform bins at low frequencies (one bin at very low frequencies) and may be directly coded with as few or fewer bits than is required to send a downmixed mono audio signal with sidechain information. A coupling or transition frequency as low as 4 kHz, 2300 Hz, 1000 Hz, or even the bottom of the frequency band of the audio signals applied to the encoder, may be acceptable for some applications, particularly those in which a very low bitrate is important. Other frequencies may provide a useful balance between bit savings and listener acceptance. The choice of a particular coupling frequency is not critical to the invention. The coupling frequency may be variable and, if variable, it may depend, for example, directly or indirectly on input signal characteristics.

Before downmixing, it is an aspect of the present invention to improve the channels’ phase angle alignments vis-à-vis each other, in order to reduce the cancellation of out-of-phase signal components when the channels are combined and to provide an improved mono composite channel. This may be accomplished by controllably shifting over time the “absolute angle” of some or all of the transform bins in ones of the channels. For example, all of the transform bins representing audio above a coupling frequency, thus defining a frequency band of interest, may be controllably shifted over time, as necessary, in every channel or, when one channel is used as a reference, in all but the reference channel.

The “absolute angle” of a bin may be taken as the angle of the magnitude-and-angle representation of each complex valued transform bin produced by a filterbank. Controllable shifting of the absolute angles of bins in a channel is performed by an angle rotation function or device (“Rotate Angle”). Rotate Angle 8 processes the output of Filterbank 2 prior to its application to the downmix summation provided by Additive Combiner 6, while Rotate Angle 10 processes the output of Filterbank 4 prior to its application to the Additive Combiner 6. It will be appreciated that, under some signal conditions, no angle rotation may be required for a particular transform bin over a time period (the time period of a frame, in examples described herein). Below the coupling frequency, the channel information may be encoded discretely (not shown in FIG. 1).

In principle, an improvement in the channels’ phase angle alignments with respect to each other may be accomplished by shifting the phase of every transform bin or subband by the negative of its absolute phase angle, in each block throughout the frequency band of interest. Although this substantially avoids cancellation of out-of-phase signal components, it tends to cause artifacts that may be audible, particularly if the resulting mono composite signal is listened to in isolation. Thus, it is desirable to employ the principle of “least treatment” by shifting the absolute angles of bins in a channel only as much as necessary to minimize out-of-phase cancellation in the downmix process and minimize spatial image collapse of the multichannel signals reconstituted by the decoder. Techniques for determining such angle shifts are described below. Such techniques include time and frequency smoothing and the manner in which the signal processing responds to the presence of a transient.

Energy normalization may also be performed on a per-bin basis in the encoder to reduce further any remaining out-of-phase cancellation of isolated bins, as described further below. Also as described further below, energy normalization may also be performed on a per-subband basis (in the decoder) to assure that the energy of the mono composite signal equals the sums of the energies of the contributing channels.

Each input channel has an audio analyzer function or device (“Audio Analyzer”) associated with it for generating the sidechain information for that channel and for controlling the amount or degree of angle rotation applied to the channel before it is applied to the downmix summation 6. The Filterbank outputs of channels 1 and n are applied to Audio Analyzer 12 and to Audio Analyzer 14, respectively. Audio Analyzer 12 generates the sidechain information for channel 1 and the amount of phase angle rotation for channel 1. Audio Analyzer 14 generates the sidechain information for channel n and the amount of angle rotation for channel n. It will be understood that such references herein to “angle” refer to phase angle.

The sidechain information for each channel generated by an audio analyzer for each channel may include:

an Amplitude Scale Factor (“Amplitude SF”),
an Angle Control Parameter,
a Decorrelation Scale Factor (“Decorrelation SF”),
a Transient Flag, and
optionally, an Interpolation Flag.

Such sidechain information may be characterized as “spatial parameters,” indicative of spatial properties of the channels and/or indicative of signal characteristics that may be relevant to spatial processing, such as transients. In each case, the sidechain information applies to a single subband (except for the Transient Flag and the Interpolation Flag, each of which apply to all subbands within a channel) and may be updated once per frame, as in the examples described below, or upon the occurrence of a block switch in a related coder. Further details of the various spatial parameters are set forth below. The angle rotation for a particular channel in the encoder may be taken as the polarity-reversed Angle Control Parameter that forms part of the sidechain information.

If a reference channel is employed, that channel may not require an Audio Analyzer or, alternatively, may require an Audio Analyzer that generates only Amplitude Scale Factor sidechain information. It is not necessary to send an Amplitude Scale Factor if that scale factor can be deduced with sufficient accuracy by a decoder from the Amplitude Scale Factors of the other, non-reference, channels. It is possible to deduce in the decoder the approximate value of the reference channel's Amplitude Scale Factor if the energy normalization in the encoder assures that the scale factors across channels within any subband substantially sum square to 1, as described below. The deduced approximate reference channel Amplitude Scale Factor value may have errors as a result of the relatively coarse quantization of amplitude scale factors resulting in image shifts in the reproduced multi-channel audio. However, in a low data rate environment, such artifacts may be more acceptable than using the bits to send the reference channel's Amplitude Scale Factor. Nevertheless, in some cases it may be desirable to employ an audio analyzer for the reference channel that generates, at least, Amplitude Scale Factor sidechain information.

FIG. 1 shows in a dashed line an optional input to each audio analyzer from the PCM time domain input to the audio analyzer in the channel. This input may be used by the Audio Analyzer to detect a transient over a time period (the period of a block or frame, in the examples described herein) and to generate a transient indicator (e.g., a one-bit "Transient Flag") in response to a transient. Alternatively, as described below in the comments to Step 408 of FIG. 4, a transient may be detected in the frequency domain, in which case the Audio Analyzer need not receive a time-domain input.

The mono composite audio signal and the sidechain information for all the channels (or all the channels except the reference channel) may be stored, transmitted, or stored and transmitted to a decoding process or device ("Decoder"). Preliminary to the storage, transmission, or storage and transmission, the various audio signals and various sidechain information may be multiplexed and packed into one or more bitstreams suitable for the storage, transmission or storage and transmission medium or media. The mono composite audio may be applied to a data-rate reducing encoding process or device such as, for example, a perceptual encoder or to a perceptual encoder and an entropy coder (e.g., arithmetic or Huffman coder) (sometimes referred to as a "lossless" coder) prior to storage, transmission, or storage and transmission. Also, as mentioned above, the mono composite audio and related sidechain information may be derived from multiple input channels only for audio frequencies above a certain frequency (a "coupling" frequency). In that case, the audio frequencies below the coupling frequency in each of the multiple input channels may be stored, transmitted or stored and transmitted as discrete channels or may be combined or processed in some manner other than as described herein. Such discrete or otherwise-combined channels may also be applied to a data reducing encoding process or device such as, for example, a perceptual encoder or a perceptual encoder and an entropy encoder. The mono composite audio and the discrete multichannel audio may all be applied to an integrated perceptual encoding or perceptual and entropy encoding process or device.

The particular manner in which sidechain information is carried in the encoder bitstream is not critical to the invention. If desired, the sidechain information may be carried in such as way that the bitstream is compatible with legacy decoders (i.e., the bitstream is backwards-compatible). Many suitable techniques for doing so are known. For example, many encoders generate a bitstream having unused or null bits that are ignored by the decoder. An example of such an arrangement is set forth in U.S. Pat. No. 6,807,528 B1 of Truman et al, entitled "Adding Data to a Compressed Data Frame," Oct. 19, 2004, which patent is hereby incorporated by reference in its entirety. Such bits may be replaced with the sidechain information. Another example is that the sidechain information may be steganographically encoded in the encoder's bitstream. Alternatively, the sidechain information may be stored or transmitted separately from the backwards-compatible bitstream by any technique that permits the transmission or storage of such information along with a mono/stereo bitstream compatible with legacy decoders.

Basic 1:N and 1:M Decoder

Figure 2:
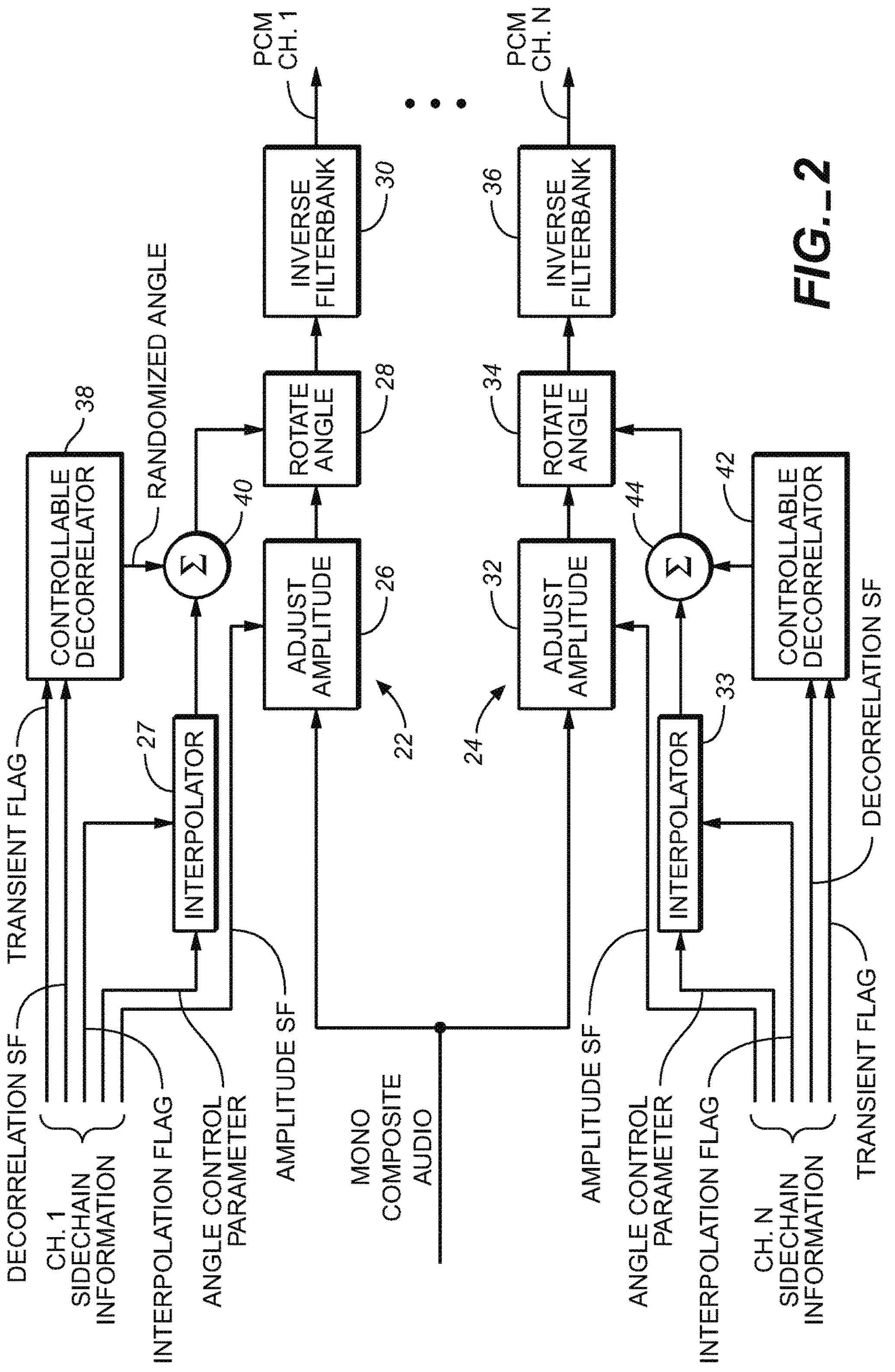
FIG. 2 is an idealized block diagram showing the principal functions or devices of a 1:N decoding arrangement embodying aspects of the present invention.

Referring to FIG. 2, a decoder function or device ("Decoder") embodying aspects of the present invention is shown. The figure is an example of a function or structure that performs as a basic decoder embodying aspects of the invention. Other functional or structural arrangements that practice aspects of the invention may be employed, including alternative and/or equivalent functional or structural arrangements described below.

The Decoder receives the mono composite audio signal and the sidechain information for all the channels or all the channels except the reference channel. If necessary, the composite audio signal and related sidechain information is demultiplexed, unpacked and/or decoded. Decoding may employ a table lookup. The goal is to derive from the mono composite audio channels a plurality of individual audio channels approximating respective ones of the audio channels applied to the Encoder of FIG. 1, subject to bitrate-reducing techniques of the present invention that are described herein.

Of course, one may choose not to recover all of the channels applied to the encoder or to use only the monophonic composite signal. Alternatively, channels in addition to the ones applied to the Encoder may be derived from the output of a Decoder according to aspects of the present invention by employing aspects of the inventions described in International Application PCT/US 02/03619, filed Feb. 7, 2002, published Aug. 15, 2002, designating the United States, and its resulting U.S. national application Ser. No. 10/467,213, filed Aug. 5, 2003, and in International Application PCT/US03/24570, filed Aug. 6, 2003, published Mar. 4, 2001 as WO 2004/019656, designating the United States, and its resulting U.S. national application Ser. No. 10/522,515, filed Jan. 27, 2005. Said applications are hereby incorporated by reference in their entirety. Channels recovered by a Decoder practicing aspects of the present invention are particularly useful in connection with the channel multiplication techniques of the cited and incorporated applications in that the recovered channels not only have useful inter-channel amplitude relationships but also have useful inter-channel phase relationships. Another alternative for channel multiplication is to employ a matrix decoder to derive additional channels. The interchannel amplitude- and phase-preservation aspects of the present invention make the output channels of a decoder embodying aspects of the present invention particularly suitable for application to an amplitude- and phase-sensitive matrix decoder. Many such matrix decoders employ wideband control circuits that operate properly only when the signals applied to them are stereo throughout the signals' bandwidth. Thus, if the aspects of the present invention are embodied in an N:1:N system in which N is 2, the two channels recovered by the decoder may be applied to a 2:M active matrix decoder. Such channels may have been discrete channels below a coupling frequency, as mentioned above. Many suitable active matrix decoders are well known in the art, including, for example, matrix decoders known as "Pro Logic" and "Pro Logic II" decoders ("Pro Logic" is a trademark of Dolby Laboratories Licensing Corporation). Aspects of Pro Logic decoders are disclosed in U.S. Pat. Nos. 4,799,260 and 4,941,177, each of which is incorporated by reference herein in its entirety. Aspects of Pro Logic II decoders are disclosed in pending U.S. patent application Ser. No. 09/532,711 of Fosgate, entitled "Method for Deriving at Least Three Audio Signals from Two Input Audio Signals," filed Mar. 22, 2000 and published as WO 01/41504 on Jun. 7, 2001, and in pending U.S. patent application Ser. No. 10/362,786 of Fosgate et al, entitled "Method for Apparatus for Audio Matrix Decoding," filed Feb. 25, 2003 and published as US 2004/0125960 A1 on Jul. 1, 2004. Each of said applications is incorporated by reference herein in its entirety. Some aspects of the operation of Dolby Pro Logic and Pro Logic II decoders are explained, for example, in papers available on the Dolby Laboratories' website (www.dolby.com): "Dolby Surround Pro Logic Decoder Principles of Operation," by Roger Dressler, and "Mixing with Dolby Pro Logic II Technology, by Jim Hilson. Other suitable active matrix decoders may include those described in one or more of the following U.S. Patents and published International Applications (each designating the United States), each of which is hereby incorporated by reference in its entirety: U.S. Pat. Nos. 5,046,098; 5,274,740; 5,400,433; 5,625,696; 5,644,640; 5,504,819; 5,428,687; 5,172,415; and WO 02/19768.

Referring again to FIG. 2, the received mono composite audio channel is applied to a plurality of signal paths from which a respective one of each of the recovered multiple audio channels is derived. Each channel-deriving path includes, in either order, an amplitude adjusting function or device ("Adjust Amplitude") and an angle rotation function or device ("Rotate Angle").

The Adjust Amplitudes apply gains or losses to the mono composite signal so that, under certain signal conditions, the relative output magnitudes (or energies) of the output channels derived from it are similar to those of the channels at the input of the encoder. Alternatively, under certain signal conditions when "randomized" angle variations are imposed, as next described, a controllable amount of "randomized" amplitude variations may also be imposed on the amplitude of a recovered channel in order to improve its decorrelation with respect to other ones of the recovered channels.

The Rotate Angles apply phase rotations so that, under certain signal conditions, the relative phase angles of the output channels derived from the mono composite signal are similar to those of the channels at the input of the encoder. Preferably, under certain signal conditions, a controllable amount of "randomized" angle variations is also imposed on the angle of a recovered channel in order to improve its decorrelation with respect to other ones of the recovered channels.

Figure 5A:
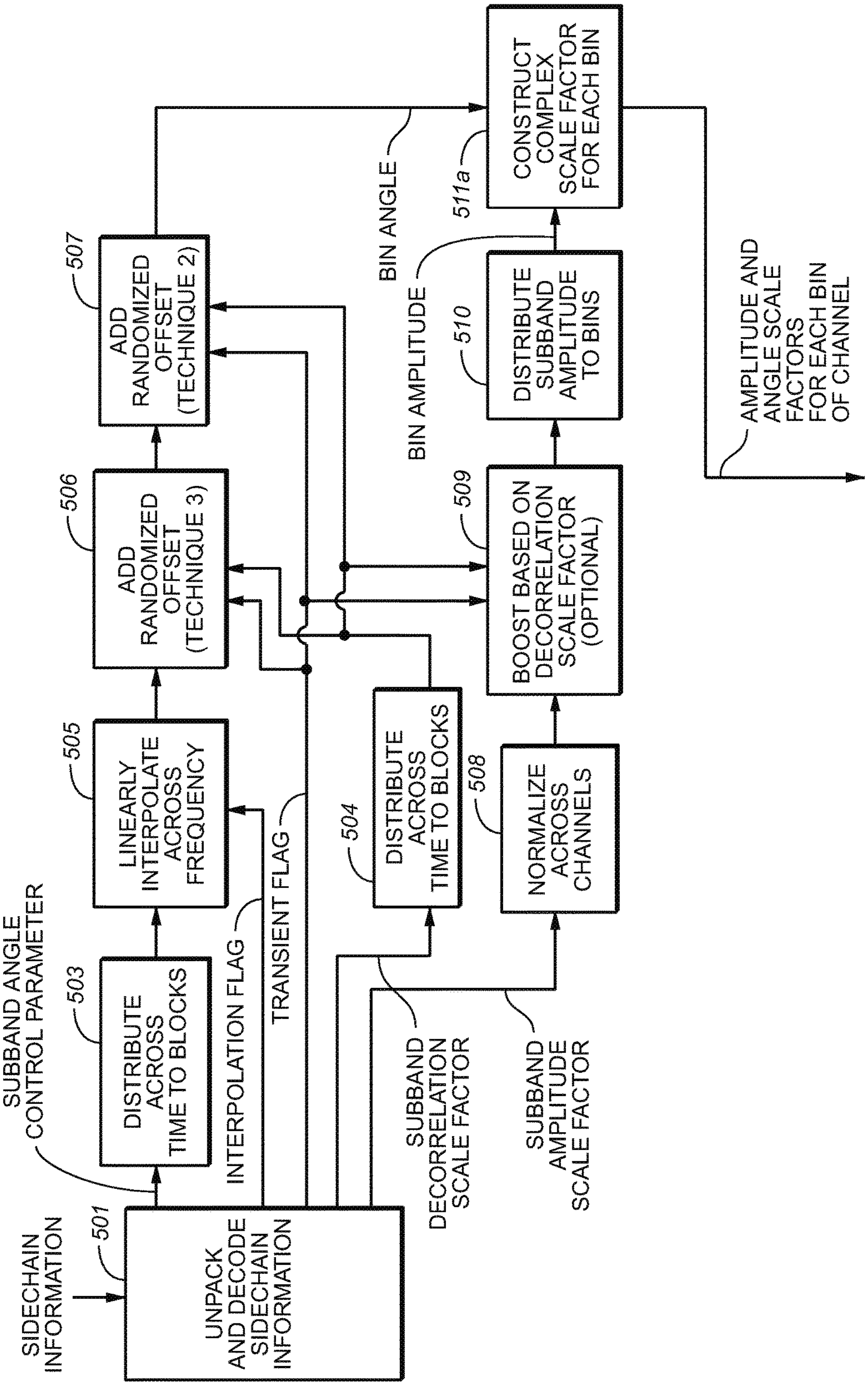
FIG. 5, divided into subsections FIG. 5A and FIG. 5B for ease of viewing, is in the nature of a hybrid flowchart and functional block diagram showing decoding steps or devices performing functions of a decoding arrangement embodying aspects of the present invention.

As discussed further below, "randomized" angle amplitude variations may include not only pseudo-random and truly random variations, but also deterministically-generated variations that have the effect of reducing cross-correlation between channels. This is discussed further below in the Comments to Step 505 of FIG. 5A.

Conceptually, the Adjust Amplitude and Rotate Angle for a particular channel scale the mono composite audio DFT coefficients to yield reconstructed transform bin values for the channel.

The Adjust Amplitude for each channel may be controlled at least by the recovered sidechain Amplitude Scale Factor for the particular channel or, in the case of the reference channel, either from the recovered sidechain Amplitude Scale Factor for the reference channel or from an Amplitude Scale Factor deduced from the recovered sidechain Amplitude Scale Factors of the other, non-reference, channels. Alternatively, to enhance decorrelation of the recovered channels, the Adjust Amplitude may also be controlled by a Randomized Amplitude Scale Factor Parameter derived from the recovered sidechain Decorrelation Scale Factor for a particular channel and the recovered sidechain Transient Flag for the particular channel.

The Rotate Angle for each channel may be controlled at least by the recovered sidechain Angle Control Parameter (in which case, the Rotate Angle in the decoder may substantially undo the angle rotation provided by the Rotate Angle in the encoder). To enhance decorrelation of the recovered channels, a Rotate Angle may also be controlled by a Randomized Angle Control Parameter derived from the recovered sidechain Decorrelation Scale Factor for a particular channel and the recovered sidechain Transient Flag for the particular channel. The Randomized Angle Control Parameter for a channel, and, if employed, the Randomized Amplitude Scale Factor for a channel, may be derived from the recovered Decorrelation Scale Factor for the channel and the recovered Transient Flag for the channel by a controllable decorrelator function or device ("Controllable Decorrelator").

Referring to the example of FIG. 2, the recovered mono composite audio is applied to a first channel audio recovery path 22, which derives the channel 1 audio, and to a second channel audio recovery path 24, which derives the channel n audio. Audio path 22 includes an Adjust Amplitude 26, a Rotate Angle 28, and, if a PCM output is desired, an inverse filterbank function or device ("Inverse Filterbank") 30. Similarly, audio path 24 includes an Adjust Amplitude 32, a Rotate Angle 34, and, if a PCM output is desired, an inverse filterbank function or device ("Inverse Filterbank") 36. As with the case of FIG. 1, only two channels are shown for simplicity in presentation, it being understood that there may be more than two channels.

The recovered sidechain information for the first channel, channel 1, may include an Amplitude Scale Factor, an Angle Control Parameter, a Decorrelation Scale Factor, a Transient Flag, and, optionally, an Interpolation Flag, as stated above in connection with the description of a basic Encoder. The Amplitude Scale Factor is applied to Adjust Amplitude 26. If the optional Interpolation Flag is employed, an optional frequency interpolator or interpolator function ("Interpolator") 27 may be employed in order to interpolate the Angle Control Parameter across frequency (e.g., across the bins in each subband of a channel). Such interpolation may be, for example, a linear interpolation of the bin angles between the centers of each subband. The state of the one-bit Interpolation Flag selects whether or not interpolation across frequency is employed, as is explained further below. The Transient Flag and Decorrelation Scale Factor are applied to a Controllable Decorrelator 38 that generates a Randomized Angle Control Parameter in response thereto. The state of the one-bit Transient Flag selects one of two multiple modes of randomized angle decorrelation, as is explained further below. The Angle Control Parameter, which may be interpolated across frequency if the Interpolation Flag and the Interpolator are employed, and the Randomized Angle Control Parameter are summed together by an additive combiner or combining function 40 in order to provide a control signal for Rotate Angle 28. Alternatively, the Controllable Decorrelator 38 may also generate a Randomized Amplitude Scale Factor in response to the Transient Flag and Decorrelation Scale Factor, in addition to generating a Randomized Angle Control Parameter. The Amplitude Scale Factor may be summed together with such a Randomized Amplitude Scale Factor by an additive combiner or combining function (not shown) in order to provide the control signal for the Adjust Amplitude 26.

Similarly, recovered sidechain information for the second channel, channel n, may also include an Amplitude Scale Factor, an Angle Control Parameter, a Decorrelation Scale Factor, a Transient Flag, and, optionally, an Interpolate Flag, as described above in connection with the description of a basic encoder. The Amplitude Scale Factor is applied to Adjust Amplitude 32. A frequency interpolator or interpolator function ("Interpolator") 33 may be employed in order to interpolate the Angle Control Parameter across frequency. As with channel 1, the state of the one-bit Interpolation Flag selects whether or not interpolation across frequency is employed. The Transient Flag and Decorrelation Scale Factor are applied to a Controllable Decorrelator 42 that generates a Randomized Angle Control Parameter in response thereto. As with channel 1, the state of the one-bit Transient Flag selects one of two multiple modes of randomized angle decorrelation, as is explained further below. The Angle Control Parameter and the Randomized Angle Control Parameter are summed together by an additive combiner or combining function 44 in order to provide a control signal for Rotate Angle 34. Alternatively, as described above in connection with channel 1, the Controllable Decorrelator 42 may also generate a Randomized Amplitude Scale Factor in response to the Transient Flag and Decorrelation Scale Factor, in addition to generating a Randomized Angle Control Parameter. The Amplitude Scale Factor and Randomized Amplitude Scale Factor may be summed together by an additive combiner or combining function (not shown) in order to provide the control signal for the Adjust Amplitude 32.

Although a process or topology as just described is useful for understanding, essentially the same results may be obtained with alternative processes or topologies that achieve the same or similar results. For example, the order of Adjust Amplitude 26 (32) and Rotate Angle 28 (34) may be reversed and/or there may be more than one Rotate Angle—one that responds to the Angle Control Parameter and another that responds to the Randomized Angle Control Parameter. The Rotate Angle may also be considered to be three rather than one or two functions or devices, as in the example of FIG. 5 described below. If a Randomized Amplitude Scale Factor is employed, there may be more than one Adjust Amplitude—one that responds to the Amplitude Scale Factor and one that responds to the Randomized Amplitude Scale Factor. Because of the human ear's greater sensitivity to amplitude relative to phase, if a Randomized Amplitude Scale Factor is employed, it may be desirable to scale its effect relative to the effect of the Randomized Angle Control Parameter so that its effect on amplitude is less than the effect that the Randomized Angle Control Parameter has on phase angle. As another alternative process or topology, the Decorrelation Scale Factor may be used to control the ratio of randomized phase angle versus basic phase angle (rather than adding a parameter representing a randomized phase angle to a parameter representing the basic phase angle), and if also employed, the ratio of randomized amplitude shift versus basic amplitude shift (rather than adding a scale factor representing a randomized amplitude to a scale factor representing the basic amplitude) (i.e., a variable crossfade in each case).

If a reference channel is employed, as discussed above in connection with the basic encoder, the Rotate Angle, Controllable Decorrelator and Additive Combiner for that channel may be omitted inasmuch as the sidechain information for the reference channel may include only the Amplitude Scale Factor (or, alternatively, if the sidechain information does not contain an Amplitude Scale Factor for the reference channel, it may be deduced from Amplitude Scale Factors of the other channels when the energy normalization in the encoder assures that the scale factors across channels within a subband sum square to 1). An Amplitude Adjust is provided for the reference channel and it is controlled by a received or derived Amplitude Scale Factor for the reference channel. Whether the reference channel's Amplitude Scale Factor is derived from the sidechain or is deduced in the decoder, the recovered reference channel is an amplitude-scaled version of the mono composite channel. It does not require angle rotation because it is the reference for the other channels' rotations.

Although adjusting the relative amplitude of recovered channels may provide a modest degree of decorrelation, if used alone amplitude adjustment is likely to result in a reproduced soundfield substantially lacking in spatialization or imaging for many signal conditions (e.g., a "collapsed" soundfield) Amplitude adjustment may affect interaural level differences at the ear, which is only one of the psychoacoustic directional cues employed by the ear. Thus, according to aspects of the invention, certain angle-adjusting techniques may be employed, depending on signal conditions, to provide additional decorrelation. Reference may be made to Table 1 that provides abbreviated comments useful in understanding the multiple angle-adjusting decorrelation techniques or modes of operation that may be employed in accordance with aspects of the invention. Other decorrelation techniques as described below in connection with the examples of FIGS. 8 and 9 may be employed instead of or in addition to the techniques of Table 1.

In practice, applying angle rotations and magnitude alterations may result in circular convolution (also known as cyclic or periodic convolution). Although, generally, it is desirable to avoid circular convolution, undesirable audible artifacts resulting from circular convolution are somewhat reduced by complementary angle shifting in an encoder and decoder. In addition, the effects of circular convolution may be tolerated in low cost implementations of aspects of the present invention, particularly those in which the downmixing to mono or multiple channels occurs only in part of the audio frequency band, such as, for example above 1500 Hz (in which case the audible effects of circular convolution are minimal). Alternatively, circular convolution may be avoided or minimized by any suitable technique, including, for example, an appropriate use of zero padding. One way to use zero padding is to transform the proposed frequency domain variation (representing angle rotations and amplitude scaling) to the time domain, window it (with an arbitrary window), pad it with zeros, then transform back to the frequency domain and multiply by the frequency domain version of the audio to be processed (the audio need not be windowed).

TABLE 1

| Angle-Adjusting Decorrelation Techniques | | | |
|---|---|---|---|
| | Technique 1 | Technique 2 | Technique 3 |
| Type of Signal (typical example) | Spectrally static source | Complex continuous signals | Complex impulsive signals (transients) |
| Effect on Decorrelation | Decorrelates low frequency and steady-state signal components | Decorrelates non-impulsive complex signal components | Decorrelates impulsive high frequency signal components |
| Effect of transient present in frame | Operates with shortened time constant | Does not operate | Operates |
| What is done | Slowly shifts (frame-by-frame) bin angle in a channel | Adds to the angle of Technique 1 a time-invariant randomized angle on a bin-by-bin basis in a channel | Adds to the angle of Technique 1 a rapidly-changing (block by block) randomized angle on a subband-by-subband basis in a channel |
| Controlled by or Scaled by | Basic phase angle is controlled by Angle Control Parameter | Amount of randomized angle is scaled directly by Decorrelation SF; same scaling across subband, scaling updated every frame | Amount of randomized angle is scaled indirectly by Decorrelation SF; same scaling across subband, scaling updated every frame |
| Frequency Resolution of angle shift | Subband (same or interpolated shift value applied to all bins in each subband) | Bin (different randomized shift value applied to each bin) | Subband (same randomized shift value applied to all bins in each subband; different randomized shift value applied to each subband in channel) |
| Time Resolution | Frame (shift values updated every frame) | Randomized shift values remain the same and do not change | Block (randomized shift values updated every block) |

For signals that are substantially static spectrally, such as, for example, a pitch pipe note, a first technique ("Technique 1") restores the angle of the received mono composite signal relative to the angle of each of the other recovered channels to an angle similar (subject to frequency and time granularity and to quantization) to the original angle of the channel relative to the other channels at the input of the encoder. Phase angle differences are useful, particularly, for providing decorrelation of low-frequency signal components below about 1500 Hz where the ear follows individual cycles of the audio signal. Preferably, Technique 1 operates under all signal conditions to provide a basic angle shift.

For high-frequency signal components above about 1500 Hz, the ear does not follow individual cycles of sound but instead responds to waveform envelopes (on a critical band basis). Hence, above about 1500 Hz decorrelation is better provided by differences in signal envelopes rather than phase angle differences. Applying phase angle shifts only in accordance with Technique 1 does not alter the envelopes of signals sufficiently to decorrelate high frequency signals. The second and third techniques ("Technique 2" and "Technique 3", respectively) add a controllable amount of randomized angle variations to the angle determined by Technique 1 under certain signal conditions, thereby causing a controllable amount of randomized envelope variations, which enhances decorrelation.

Randomized changes in phase angle are a desirable way to cause randomized changes in the envelopes of signals. A particular envelope results from the interaction of a particular combination of amplitudes and phases of spectral components within a subband. Although changing the amplitudes of spectral components within a subband changes the envelope, large amplitude changes are required to obtain a significant change in the envelope, which is undesirable because the human ear is sensitive to variations in spectral amplitude. In contrast, changing the spectral component's phase angles has a greater effect on the envelope than changing the spectral component's amplitudes—spectral components no longer line up the same way, so the reinforcements and subtractions that define the envelope occur at different times, thereby changing the envelope. Although the human ear has some envelope sensitivity, the ear is relatively phase deaf, so the overall sound quality remains substantially similar. Nevertheless, for some signal conditions, some randomization of the amplitudes of spectral components along with randomization of the phases of spectral components may provide an enhanced randomization of signal envelopes provided that such amplitude randomization does not cause undesirable audible artifacts.

Preferably, a controllable amount or degree of Technique 2 or Technique 3 operates along with Technique 1 under certain signal conditions. The Transient Flag selects Technique 2 (no transient present in the frame or block, depending on whether the Transient Flag is sent at the frame or block rate) or Technique 3 (transient present in the frame or block). Thus, there are multiple modes of operation, depending on whether or not a transient is present. Alternatively, in addition, under certain signal conditions, a controllable amount or degree of amplitude randomization also operates along with the amplitude scaling that seeks to restore the original channel amplitude.

Technique 2 is suitable for complex continuous signals that are rich in harmonics, such as massed orchestral violins. Technique 3 is suitable for complex impulsive or transient signals, such as applause, castanets, etc. (Technique 2 time smears claps in applause, making it unsuitable for such signals). As explained further below, in order to minimize audible artifacts, Technique 2 and Technique 3 have different time and frequency resolutions for applying randomized angle variations—Technique 2 is selected when a transient is not present, whereas Technique 3 is selected when a transient is present.

Technique 1 slowly shifts (frame by frame) the bin angle in a channel. The amount or degree of this basic shift is controlled by the Angle Control Parameter (no shift if the parameter is zero). As explained further below, either the same or an interpolated parameter is applied to all bins in each subband and the parameter is updated every frame. Consequently, each subband of each channel may have a phase shift with respect to other channels, providing a degree of decorrelation at low frequencies (below about 1500 Hz). However, Technique 1, by itself, is unsuitable for a transient signal such as applause. For such signal conditions, the reproduced channels may exhibit an annoying unstable comb-filter effect. In the case of applause, essentially no decorrelation is provided by adjusting only the relative amplitude of recovered channels because all channels tend to have the same amplitude over the period of a frame.

Technique 2 operates when a transient is not present. Technique 2 adds to the angle shift of Technique 1 a randomized angle shift that does not change with time, on a bin-by-bin basis (each bin has a different randomized shift) in a channel, causing the envelopes of the channels to be different from one another, thus providing decorrelation of complex signals among the channels. Maintaining the randomized phase angle values constant over time avoids block or frame artifacts that may result from block-to-block or frame-to-frame alteration of bin phase angles. While this technique is a very useful decorrelation tool when a transient is not present, it may temporally smear a transient (resulting in what is often referred to as "pre-noise"—the post-transient smearing is masked by the transient). The amount or degree of additional shift provided by Technique 2 is scaled directly by the Decorrelation Scale Factor (there is no additional shift if the scale factor is zero). Ideally, the amount of randomized phase angle added to the base angle shift (of Technique 1) according to Technique 2 is controlled by the Decorrelation Scale Factor in a manner that minimizes audible signal warbling artifacts. Such minimization of signal warbling artifacts results from the manner in which the Decorrelation Scale Factor is derived and the application of appropriate time smoothing, as described below. Although a different additional randomized angle shift value is applied to each bin and that shift value does not change, the same scaling is applied across a subband and the scaling is updated every frame.

Technique 3 operates in the presence of a transient in the frame or block, depending on the rate at which the Transient Flag is sent. It shifts all the bins in each subband in a channel from block to block with a unique randomized angle value, common to all bins in the subband, causing not only the envelopes, but also the amplitudes and phases, of the signals in a channel to change with respect to other channels from block to block. These changes in time and frequency resolution of the angle randomizing reduce steady-state signal similarities among the channels and provide decorrelation of the channels substantially without causing "pre-noise" artifacts. The change in frequency resolution of the angle randomizing, from very fine (all bins different in a channel) in Technique 2 to coarse (all bins within a subband the same, but each subband different) in Technique 3 is particularly useful in minimizing "pre-noise" artifacts. Although the ear does not respond to pure angle changes directly at high frequencies, when two or more channels mix acoustically on their way from loudspeakers to a listener, phase differences may cause amplitude changes (comb-filter effects) that may be audible and objectionable, and these are broken up by Technique 3. The impulsive characteristics of the signal minimize block-rate artifacts that might otherwise occur. Thus, Technique 3 adds to the phase shift of Technique 1 a rapidly changing (block-by-block) randomized angle shift on a subband-by-subband basis in a channel. The amount or degree of additional shift is scaled indirectly, as described below, by the Decorrelation Scale Factor (there is no additional shift if the scale factor is zero). The same scaling is applied across a subband and the scaling is updated every frame.

Although the angle-adjusting techniques have been characterized as three techniques, this is a matter of semantics and they may also be characterized as two techniques: (1) a combination of Technique 1 and a variable degree of Technique 2, which may be zero, and (2) a combination of Technique 1 and a variable degree Technique 3, which may be zero. For convenience in presentation, the techniques are treated as being three techniques.

Aspects of the multiple mode decorrelation techniques and modifications of them may be employed in providing decorrelation of audio signals derived, as by upmixing, from one or more audio channels even when such audio channels are not derived from an encoder according to aspects of the present invention. Such arrangements, when applied to a mono audio channel, are sometimes referred to as "pseudo-stereo" devices and functions. Any suitable device or function (an "upmixer") may be employed to derive multiple signals from a mono audio channel or from multiple audio channels. Once such multiple audio channels are derived by an upmixer, one or more of them may be decorrelated with respect to one or more of the other derived audio signals by applying the multiple mode decorrelation techniques described herein. In such an application, each derived audio channel to which the decorrelation techniques are applied may be switched from one mode of operation to another by detecting transients in the derived audio channel itself. Alternatively, the operation of the transient-present technique (Technique 3) may be simplified to provide no shifting of the phase angles of spectral components when a transient is present.

Sidechain Information

As mentioned above, the sidechain information may include: an Amplitude Scale Factor, an Angle Control Parameter, a Decorrelation Scale Factor, a Transient Flag, and, optionally, an Interpolation Flag. Such sidechain information for a practical embodiment of aspects of the present invention may be summarized in the following Table 2. Typically, the sidechain information may be updated once per frame.

TABLE 2

Sidechain Information Characteristics for a Channel

| Sidechain Information | Value Range | Represents (is "a measure of") | Quantization Levels | Primary Purpose |
|---|---|---|---|---|
| Subband Angle Control Parameter | 0 → +2π | Smoothed time average in each subband of difference between angle of each bin in subband for a channel and that of the corresponding bin in subband of a reference channel | 6 bit (64 levels) | Provides basic angle rotation for each bin in channel |
| Subband Decorrelation Scale Factor | 0 → 1 The Subband Decorrelation Scale Factor is high only if both the Spectral-Steadiness Factor and the Interchannel Angle Consistency Factor are low. | Spectral-steadiness of signal characteristics over time in a subband of a channel (the Spectral-Steadiness Factor) and the consistency in the same subband of a channel of bin angles with respect to corresponding bins of a reference channel (the Interchannel Angle Consistency Factor) | 3 bit (8 levels) | Scales randomized angle shifts added to basic angle rotation, and, if employed, also scales randomized Amplitude Scale Factor added to basic Amplitude Scale Factor, and, optionally, scales degree of reverberation |
| Subband Amplitude Scale Factor | 0 to 31 (whole integer) 0 is highest amplitude 31 is lowest amplitude | Energy or amplitude in subband of a channel with respect to energy or amplitude for same subband across all channels | 5 bit (32 levels) Granularity is 1.5 dB, so the range is 31 * 1.5 = 46.5 dB plus final value = off. | Scales amplitude of bins in a subband in a channel |
| Transient Flag | 1, 0 (True/False) (polarity is arbitrary) | Presence of a transient in the frame or in the block | 1 bit (2 levels) | Determines which technique for adding randomized angle shifts, or both angle shifts and amplitude shifts, is employed |
| Interpolation Flag | 1, 0 (True/False) (polarity is arbitrary) | A spectral peak near a subband boundary or phase angles within a channel have a linear progression | 1 bit (2 levels) | Determines if the basic angle rotation is interpolated across frequency |

In each case, the sidechain information of a channel applies to a single subband (except for the Transient Flag and the Interpolation Flag, each of which apply to all subbands in a channel) and may be updated once per frame. Although the time resolution (once per frame), frequency resolution (subband), value ranges and quantization levels indicated have been found to provide useful performance and a useful compromise between a low bitrate and performance, it will be appreciated that these time and frequency resolutions, value ranges and quantization levels are not critical and that other resolutions, ranges and levels may employed in practicing aspects of the invention. For example, the Transient Flag and/or the Interpolation Flag, if employed, may be updated once per block with only a minimal increase in sidechain data overhead. In the case of the Transient Flag, doing so has the advantage that the switching from Technique 2 to Technique 3 and vice-versa is more accurate. In addition, as mentioned above, sidechain information may be updated upon the occurrence of a block switch of a related coder.

It will be noted that Technique 2, described above (see also Table 1), provides a bin frequency resolution rather than a subband frequency resolution (i.e., a different pseudo random phase angle shift is applied to each bin rather than to each subband) even though the same Subband Decorrelation Scale Factor applies to all bins in a subband. It will also be noted that Technique 3, described above (see also Table 1), provides a block frequency resolution (i.e., a different randomized phase angle shift is applied to each block rather than to each frame) even though the same Subband Decorrelation Scale Factor applies to all bins in a subband. Such resolutions, greater than the resolution of the sidechain information, are possible because the randomized phase angle shifts may be generated in a decoder and need not be known in the encoder (this is the case even if the encoder also applies a randomized phase angle shift to the encoded mono composite signal, an alternative that is described below). In other words, it is not necessary to send sidechain information having bin or block granularity even though the decorrelation techniques employ such granularity. The decoder may employ, for example, one or more lookup tables of randomized bin phase angles. The obtaining of time and/or frequency resolutions for decorrelation greater than the sidechain information rates is among the aspects of the present invention. Thus, decorrelation by way of randomized phases is performed either with a fine frequency resolution (bin-by-bin) that does not change with time (Technique 2), or with a coarse frequency resolution (band-by-band) ((or a fine frequency resolution (bin-by-bin) when frequency interpolation is employed, as described further below)) and a fine time resolution (block rate) (Technique 3).

It will also be appreciated that as increasing degrees of randomized phase shifts are added to the phase angle of a recovered channel, the absolute phase angle of the recovered channel differs more and more from the original absolute phase angle of that channel. An aspect of the present invention is the appreciation that the resulting absolute phase angle of the recovered channel need not match that of the original channel when signal conditions are such that the randomized phase shifts are added in accordance with aspects of the present invention. For example, in extreme cases when the Decorrelation Scale Factor causes the highest degree of randomized phase shift, the phase shift caused by Technique 2 or Technique 3 overwhelms the basic phase shift caused by Technique 1. Nevertheless, this is of no concern in that a randomized phase shift is audibly the same as the different random phases in the original signal that give rise to a Decorrelation Scale Factor that causes the addition of some degree of randomized phase shifts.

As mentioned above, randomized amplitude shifts may by employed in addition to randomized phase shifts. For example, the Adjust Amplitude may also be controlled by a Randomized Amplitude Scale Factor Parameter derived from the recovered sidechain Decorrelation Scale Factor for a particular channel and the recovered sidechain Transient Flag for the particular channel Such randomized amplitude shifts may operate in two modes in a manner analogous to the application of randomized phase shifts. For example, in the absence of a transient, a randomized amplitude shift that does not change with time may be added on a bin-by-bin basis (different from bin to bin), and, in the presence of a transient (in the frame or block), a randomized amplitude shift that changes on a block-by-block basis (different from block to block) and changes from subband to subband (the same shift for all bins in a subband; different from subband to subband). Although the amount or degree to which randomized amplitude shifts are added may be controlled by the Decorrelation Scale Factor, it is believed that a particular scale factor value should cause less amplitude shift than the corresponding randomized phase shift resulting from the same scale factor value in order to avoid audible artifacts.

When the Transient Flag applies to a frame, the time resolution with which the Transient Flag selects Technique 2 or Technique 3 may be enhanced by providing a supplemental transient detector in the decoder in order to provide a temporal resolution finer than the frame rate or even the block rate. Such a supplemental transient detector may detect the occurrence of a transient in the mono or multichannel composite audio signal received by the decoder and such detection information is then sent to each Controllable Decorrelator (as 38, 42 of FIG. 2). Then, upon the receipt of a Transient Flag for its channel, the Controllable Decorrelator switches from Technique 2 to Technique 3 upon receipt of the decoder's local transient detection indication. Thus, a substantial improvement in temporal resolution is possible without increasing the sidechain bitrate, albeit with decreased spatial accuracy (the encoder detects transients in each input channel prior to their downmixing, whereas, detection in the decoder is done after downmixing).

As an alternative to sending sidechain information on a frame-by-frame basis, sidechain information may be updated every block, at least for highly dynamic signals. As mentioned above, updating the Transient Flag and/or the Interpolation Flag every block results in only a small increase in sidechain data overhead. In order to accomplish such an increase in temporal resolution for other sidechain information without substantially increasing the sidechain data rate, a block-floating-point differential coding arrangement may be used. For example, consecutive transform blocks may be collected in groups of six over a frame. The full sidechain information may be sent for each subband-channel in the first block. In the five subsequent blocks, only differential values may be sent, each the difference between the current-block amplitude and angle, and the equivalent values from the previous-block. This results in very low data rate for static signals, such as a pitch pipe note. For more dynamic signals, a greater range of difference values is required, but at less precision. So, for each group of five differential values, an exponent may be sent first, using, for example, 3 bits, then differential values are quantized to, for example, 2-bit accuracy. This arrangement reduces the average worst-case sidechain data rate by about a factor of two. Further reduction may be obtained by omitting the sidechain data for a reference channel (since it can be derived from the other channels), as discussed above, and by using, for example, arithmetic coding. Alternatively or in addition, differential coding across frequency may be employed by sending, for example, differences in subband angle or amplitude.

Whether sidechain information is sent on a frame-by-frame basis or more frequently, it may be useful to interpolate sidechain values across the blocks in a frame. Linear interpolation over time may be employed in the manner of the linear interpolation across frequency, as described below.

One suitable implementation of aspects of the present invention employs processing steps or devices that implement the respective processing steps and are functionally related as next set forth. Although the encoding and decoding steps listed below may each be carried out by computer software instruction sequences operating in the order of the below listed steps, it will be understood that equivalent or similar results may be obtained by steps ordered in other ways, taking into account that certain quantities are derived from earlier ones. For example, multi-threaded computer software instruction sequences may be employed so that certain sequences of steps are carried out in parallel. Alternatively, the described steps may be implemented as devices that perform the described functions, the various devices having functions and functional interrelationships as described hereinafter.

Encoding

Figure 4B:
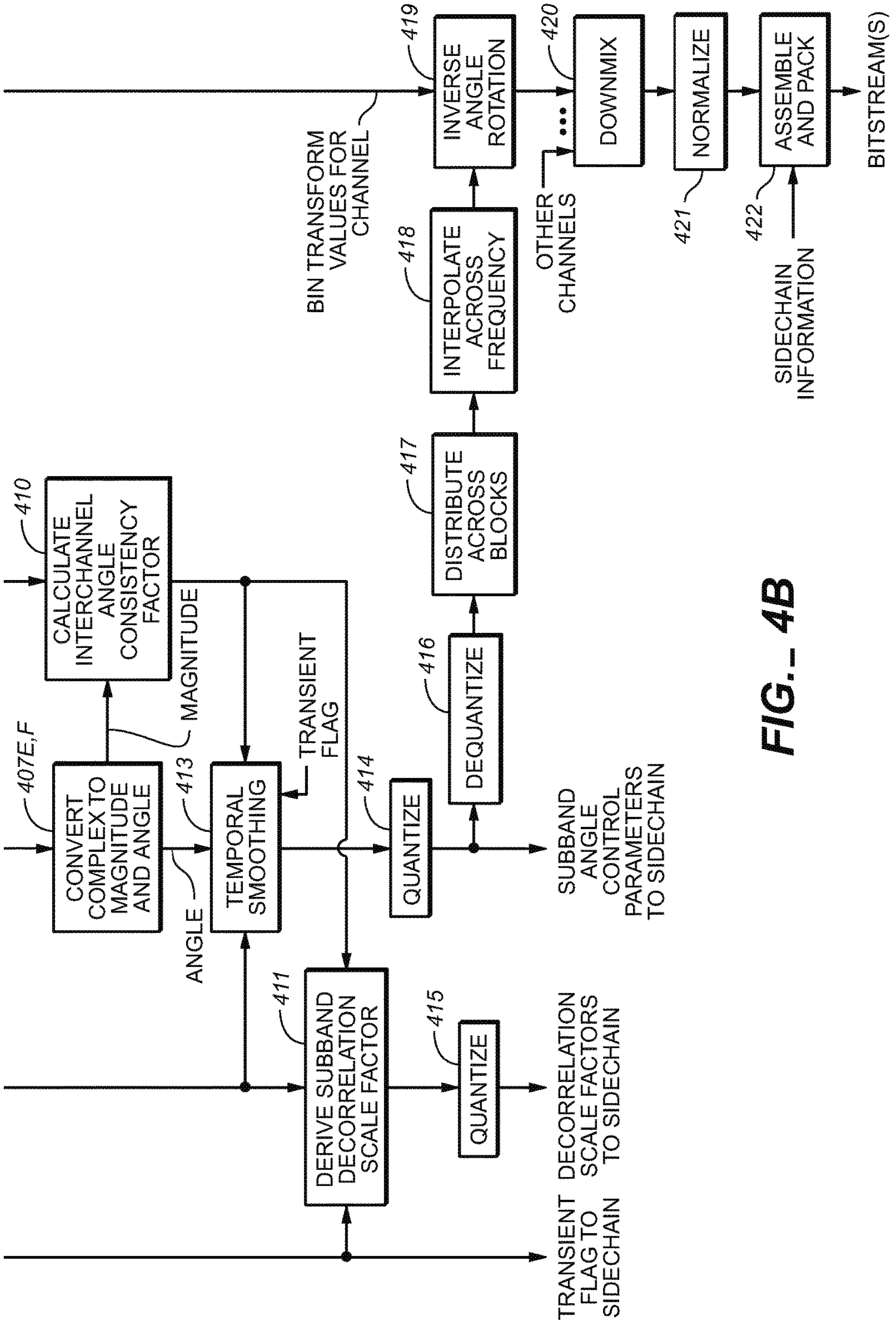
FIG. 4, divided into subsections FIG. 4A and FIG. 4B for ease of viewing, is in the nature of a hybrid flowchart and functional block diagram showing encoding steps or devices performing functions of an encoding arrangement embodying aspects of the present invention.

The encoder or encoding function may collect a frame's worth of data before it derives sidechain information and downmixes the frame's audio channels to a single monophonic (mono) audio channel (in the manner of the example of FIG. 1, described above), or to multiple audio channels (in the manner of the example of FIG. 6, described below). By doing so, sidechain information may be sent first to a decoder, allowing the decoder to begin decoding immediately upon receipt of the mono or multiple channel audio information. Steps of an encoding process ("encoding steps") may be described as follows. With respect to encoding steps, reference is made to FIG. 4, which is in the nature of a hybrid flowchart and functional block diagram. Through Step 419, FIG. 4 shows encoding steps for one channel Steps 420 and 421 apply to all of the multiple channels that are combined to provide a composite mono signal output or are matrixed together to provide multiple channels, as described below in connection with the example of FIG. 6.

Step 401. Detect Transients a. Perform transient detection of the PCM values in an input audio channel.

b. Set a one-bit Transient Flag True if a transient is present in any block of a frame for the channel.

Comments Regarding Step 401:

The Transient Flag forms a portion of the sidechain information and is also used in Step 411, as described below. Transient resolution finer than block rate in the decoder may improve decoder performance Although, as discussed above, a block-rate rather than a frame-rate Transient Flag may form a portion of the sidechain information with a modest increase in bitrate, a similar result, albeit with decreased spatial accuracy, may be accomplished without increasing the sidechain bitrate by detecting the occurrence of transients in the mono composite signal received in the decoder.

There is one transient flag per channel per frame, which, because it is derived in the time domain, necessarily applies to all subbands within that channel. The transient detection may be performed in the manner similar to that employed in an AC-3 encoder for controlling the decision of when to switch between long and short length audio blocks, but with a higher sensitivity and with the Transient Flag True for any frame in which the Transient Flag for a block is True (an AC-3 encoder detects transients on a block basis). In particular, see Section 8.2.2 of the above-cited A/52A document. The sensitivity of the transient detection described in Section 8.2.2 may be increased by adding a sensitivity factor F to an equation set forth therein. Section 8.2.2 of the A/52A document is set forth below, with the sensitivity factor added (Section 8.2.2 as reproduced below is corrected to indicate that the low pass filter is a cascaded biquad direct form II IIR filter rather than "form I" as in the published A/52A document; Section 8.2.2 was correct in the earlier A/52 document). Although it is not critical, a sensitivity factor of 0.2 has been found to be a suitable value in a practical embodiment of aspects of the present invention.

Alternatively, a similar transient detection technique described in U.S. Pat. No. 5,394,473 may be employed. The '473 patent describes aspects of the A/52A document transient detector in greater detail. Both said A/52A document and said '473 patent are hereby incorporated by reference in their entirety.

As another alternative, transients may be detected in the frequency domain rather than in the time domain (see the Comments to Step 408). In that case, Step 401 may be omitted and an alternative step employed in the frequency domain as described below.

Step 402. Window and DFT.

Multiply overlapping blocks of PCM time samples by a time window and convert them to complex frequency values via a DFT as implemented by an FFT.

Step 403. Convert Complex Values to Magnitude and Angle.

Convert each frequency-domain complex transform bin value (a+jb) to a magnitude and angle representation using standard complex manipulations:

$$\text{Magnitude}=\text{square\_root}(a^2+b^2) \quad \text{a.}$$

$$\text{Angle}=\arctan(b/a) \quad \text{b.}$$

Comments Regarding Step 403:

Some of the following Steps use or may use, as an alternative, the energy of a bin, defined as the above magnitude squared (i.e., energy=$(a^2+b^2)$).

Step 404. Calculate Subband Energy.

a. Calculate the subband energy per block by adding bin energy values within each subband (a summation across frequency).

b. Calculate the subband energy per frame by averaging or accumulating the energy in all the blocks in a frame (an averaging/accumulation across time).

c. If the coupling frequency of the encoder is below about 1000 Hz, apply the subband frame-averaged or frame-accumulated energy to a time smoother that operates on all subbands below that frequency and above the coupling frequency.

Comments Regarding Step 404*c*:

Time smoothing to provide inter-frame smoothing in low frequency subbands may be useful. In order to avoid artifact-causing discontinuities between bin values at subband boundaries, it may be useful to apply a progressively-decreasing time smoothing from the lowest frequency subband encompassing and above the coupling frequency (where the smoothing may have a significant effect) up through a higher frequency subband in which the time smoothing effect is measurable, but inaudible, although nearly audible. A suitable time constant for the lowest frequency range subband (where the subband is a single bin if subbands are critical bands) may be in the range of 50 to 100 milliseconds, for example. Progressively-decreasing time smoothing may continue up through a subband encompassing about 1000 Hz where the time constant may be about 10 milliseconds, for example.

Although a first-order smoother is suitable, the smoother may be a two-stage smoother that has a variable time constant that shortens its attack and decay time in response to a transient (such a two-stage smoother may be a digital equivalent of the analog two-stage smoothers described in U.S. Pat. Nos. 3,846,719 and 4,922,535, each of which is hereby incorporated by reference in its entirety). In other words, the steady-state time constant may be scaled according to frequency and may also be variable in response to transients. Alternatively, such smoothing may be applied in Step 412.

Step 405. Calculate Sum of Bin Magnitudes.

a. Calculate the sum per block of the bin magnitudes (Step 403) of each subband (a summation across frequency).

b. Calculate the sum per frame of the bin magnitudes of each subband by averaging or accumulating the magnitudes of Step 405*a* across the blocks in a frame (an averaging/accumulation across time). These sums are used to calculate an Interchannel Angle Consistency Factor in Step 410 below.

c. If the coupling frequency of the encoder is below about 1000 Hz, apply the subband frame-averaged or frame-accumulated magnitudes to a time smoother that operates on all subbands below that frequency and above the coupling frequency.

Comments Regarding Step 405*c:*

See comments regarding step 404*c* except that in the case of Step 405*c*, the time smoothing may alternatively be performed as part of Step 410.

Step 406. Calculate Relative Interchannel Bin Phase Angle.

Calculate the relative interchannel phase angle of each transform bin of each block by subtracting from the bin angle of Step 403 the corresponding bin angle of a reference channel (for example, the first channel). The result, as with other angle additions or subtractions herein, is taken modulo (π, −π) radians by adding or subtracting 2π until the result is within the desired range of −π to +π.

Step 407. Calculate Interchannel Subband Phase Angle.

For each channel, calculate a frame-rate amplitude-weighted average interchannel phase angle for each subband as follows:

a. For each bin, construct a complex number from the magnitude of Step 403 and the relative interchannel bin phase angle of Step 406.

b. Add the constructed complex numbers of Step 407*a* across each subband (a summation across frequency).

Comment Regarding Step 407*b*: For example, if a subband has two bins and one of the bins has a complex value of 1+j1 and the other bin has a complex value of 2+j2, their complex sum is 3+j3.

c. Average or accumulate the per block complex number sum for each subband of Step 407*b* across the blocks of each frame (an averaging or accumulation across time).

d. If the coupling frequency of the encoder is below about 1000 Hz, apply the subband frame-averaged or frame-accumulated complex value to a time smoother that operates on all subbands below that frequency and above the coupling frequency.

Comments Regarding Step 407*d*: See comments regarding Step 404*c* except that in the case of Step 407*d*, the time smoothing may alternatively be performed as part of Steps 407*e* or 410.

e. Compute the magnitude of the complex result of Step 407*d* as per Step 403.

Comment Regarding Step 407*e*: This magnitude is used in Step 410*a* below. In the simple example given in Step 407*b*, the magnitude of 3+j3 is square_root (9+9)=4.24.

f. Compute the angle of the complex result as per Step 403.

Comments Regarding Step 407*f*: In the simple example given in Step 407*b*, the angle of 3+j3 is arctan (3/3)=45 degrees=π/4 radians. This subband angle is signal-dependently time-smoothed (see Step 413) and quantized (see Step 414) to generate the Subband Angle Control Parameter sidechain information, as described below.

Step 408. Calculate Bin Spectral-Steadiness Factor

For each bin, calculate a Bin Spectral-Steadiness Factor in the range of 0 to 1 as follows:

a. Let $x_m$=bin magnitude of present block calculated in Step 403.

b. Let $y_m$=corresponding bin magnitude of previous block.

c. If $x_m > y_m$, then Bin Dynamic Amplitude Factor=$(y_m/x_m)^2$;

d. Else if $y_m > x_m$, then Bin Dynamic Amplitude Factor=$(x_m/y_m)^2$, e. Else if $y_m = x_m$, then Bin Spectral-Steadiness Factor=1.

Comment Regarding Step 408:

"Spectral steadiness" is a measure of the extent to which spectral components (e.g., spectral coefficients or bin values) change over time. A Bin Spectral-Steadiness Factor of 1 indicates no change over a given time period.

Spectral Steadiness may also be taken as an indicator of whether a transient is present. A transient may cause a sudden rise and fall in spectral (bin) amplitude over a time period of one or more blocks, depending on its position with regard to blocks and their boundaries. Consequently, a change in the Bin Spectral-Steadiness Factor from a high value to a low value over a small number of blocks may be taken as an indication of the presence of a transient in the block or blocks having the lower value. A further confirmation of the presence of a transient, or an alternative to employing the Bin Spectral-Steadiness factor, is to observe the phase angles of bins within the block (for example, at the phase angle output of Step 403). Because a transient is likely to occupy a single temporal position within a block and have the dominant energy in the block, the existence and position of a transient may be indicated by a substantially uniform delay in phase from bin to bin in the block—namely, a substantially linear ramp of phase angles as a function of frequency. Yet a further confirmation or alternative is to observe the bin amplitudes over a small number of blocks (for example, at the magnitude output of Step 403), namely by looking directly for a sudden rise and fall of spectral level.

Alternatively, Step 408 may look at three consecutive blocks instead of one block. If the coupling frequency of the encoder is below about 1000 Hz, Step 408 may look at more than three consecutive blocks. The number of consecutive blocks may taken into consideration vary with frequency such that the number gradually increases as the subband frequency range decreases. If the Bin Spectral-Steadiness Factor is obtained from more than one block, the detection of a transient, as just described, may be determined by separate steps that respond only to the number of blocks useful for detecting transients.

As a further alternative, bin energies may be used instead of bin magnitudes.

As yet a further alternative, Step 408 may employ an "event decision" detecting technique as described below in the comments following Step 409.

Step 409. Compute Subband Spectral-Steadiness Factor.

Compute a frame-rate Subband Spectral-Steadiness Factor on a scale of 0 to 1 by forming an amplitude-weighted average of the Bin Spectral-Steadiness Factor within each subband across the blocks in a frame as follows:

a. For each bin, calculate the product of the Bin Spectral-Steadiness Factor of Step 408 and the bin magnitude of Step 403.

b. Sum the products within each subband (a summation across frequency).

c. Average or accumulate the summation of Step 409*b* in all the blocks in a frame (an averaging/accumulation across time).

d. If the coupling frequency of the encoder is below about 1000 Hz, apply the subband frame-averaged or frame-accumulated summation to a time smoother that operates on all subbands below that frequency and above the coupling frequency.

Comments Regarding Step 409*d*: See comments regarding Step 404*c* except that in the case of Step 409*d*, there is no suitable subsequent step in which the time smoothing may alternatively be performed.

e. Divide the results of Step 409*c* or Step 409*d*, as appropriate, by the sum of the bin magnitudes (Step 403) within the subband.

Comment Regarding Step 409*e*: The multiplication by the magnitude in Step 409*a* and the division by the sum of the magnitudes in Step 409*e* provide amplitude weighting. The output of Step 408 is independent of absolute amplitude and, if not amplitude weighted, may cause the output or Step 409 to be controlled by very small amplitudes, which is undesirable.

f. Scale the result to obtain the Subband Spectral-Steadiness Factor by mapping the range from {0.5 . . . 1} to {0 . . . 1}. This may be done by multiplying the result by 2, subtracting 1, and limiting results less than 0 to a value of 0.

Comment Regarding Step 409*f*: Step 409*f* may be useful in assuring that a channel of noise results in a Subband Spectral-Steadiness Factor of zero.

Comments Regarding Steps 408 and 409:

The goal of Steps 408 and 409 is to measure spectral steadiness—changes in spectral composition over time in a subband of a channel. Alternatively, aspects of an "event decision" sensing such as described in International Publication Number WO 02/097792 A1 (designating the United States) may be employed to measure spectral steadiness instead of the approach just described in connection with Steps 408 and 409. U.S. patent application Ser. No. 10/478,538, filed Nov. 20, 2003 is the United States' national application of the published PCT Application WO 02/097792 A1. Both the published PCT application and the U.S. application are hereby incorporated by reference in their entirety. According to these incorporated applications, the magnitudes of the complex FFT coefficient of each bin are calculated and normalized (largest magnitude is set to a value of one, for example). Then the magnitudes of corresponding bins (in dB) in consecutive blocks are subtracted (ignoring signs), the differences between bins are summed, and, if the sum exceeds a threshold, the block boundary is considered to be an auditory event boundary. Alternatively, changes in amplitude from block to block may also be considered along with spectral magnitude changes (by looking at the amount of normalization required).

If aspects of the incorporated event-sensing applications are employed to measure spectral steadiness, normalization may not be required and the changes in spectral magnitude (changes in amplitude would not be measured if normalization is omitted) preferably are considered on a subband basis. Instead of performing Step 408 as indicated above, the decibel differences in spectral magnitude between corresponding bins in each subband may be summed in accordance with the teachings of said applications. Then, each of those sums, representing the degree of spectral change from block to block may be scaled so that the result is a spectral steadiness factor having a range from 0 to 1, wherein a value of 1 indicates the highest steadiness, a change of 0 dB from block to block for a given bin. A value of 0, indicating the lowest steadiness, may be assigned to decibel changes equal to or greater than a suitable amount, such as 12 dB, for example. These results, a Bin Spectral-Steadiness Factor, may be used by Step 409 in the same manner that Step 409 uses the results of Step 408 as described above. When Step 409 receives a Bin Spectral-Steadiness Factor obtained by employing the just-described alternative event decision sensing technique, the Subband Spectral-Steadiness Factor of Step 409 may also be used as an indicator of a transient. For example, if the range of values produced by Step 409 is 0 to 1, a transient may be considered to be present when the Subband Spectral-Steadiness Factor is a small value, such as, for example, 0.1, indicating substantial spectral unsteadiness.

It will be appreciated that the Bin Spectral-Steadiness Factor produced by Step 408 and by the just-described alternative to Step 408 each inherently provide a variable threshold to a certain degree in that they are based on relative changes from block to block. Optionally, it may be useful to supplement such inherency by specifically providing a shift in the threshold in response to, for example, multiple transients in a frame or a large transient among smaller transients (e.g., a loud transient coming atop mid- to low-level applause). In the case of the latter example, an event detector may initially identify each clap as an event, but a loud transient (e.g., a drum hit) may make it desirable to shift the threshold so that only the drum hit is identified as an event.

Alternatively, a randomness metric may be employed (for example, as described in U.S. Pat. Re 36,714, which is hereby incorporated by reference in its entirety) instead of a measure of spectral-steadiness over time.

Step 410. Calculate Interchannel Angle Consistency Factor.

For each subband having more than one bin, calculate a frame-rate Interchannel Angle Consistency Factor as follows:

a. Divide the magnitude of the complex sum of Step 407*e* by the sum of the magnitudes of Step 405. The resulting "raw" Angle Consistency Factor is a number in the range of 0 to 1.

b. Calculate a correction factor: let n=the number of values across the subband contributing to the two quantities in the above step (in other words, "n" is the number of bins in the subband). If n is less than 2, let the Angle Consistency Factor be 1 and go to Steps 411 and 413.

c. Let r=Expected Random Variation=1/n. Subtract r from the result of the Step 410*b*.

d. Normalize the result of Step 410*c* by dividing by (1−r). The result has a maximum value of 1. Limit the minimum value to 0 as necessary.

Comments Regarding Step 410:

Interchannel Angle Consistency is a measure of how similar the interchannel phase angles are within a subband over a frame period. If all bin interchannel angles of the subband are the same, the Interchannel Angle Consistency Factor is 1.0; whereas, if the interchannel angles are randomly scattered, the value approaches zero.

The Subband Angle Consistency Factor indicates if there is a phantom image between the channels. If the consistency is low, then it is desirable to decorrelate the channels. A high value indicates a fused image. Image fusion is independent of other signal characteristics.

It will be noted that the Subband Angle Consistency Factor, although an angle parameter, is determined indirectly from two magnitudes. If the interchannel angles are all the same, adding the complex values and then taking the magnitude yields the same result as taking all the magnitudes and adding them, so the quotient is 1. If the interchannel angles are scattered, adding the complex values (such as adding vectors having different angles) results in at least partial cancellation, so the magnitude of the sum is less than the sum of the magnitudes, and the quotient is less than 1.

Following is a simple example of a subband having two bins:

Suppose that the two complex bin values are (3+j4) and (6+j8). (Same angle each case: angle=arctan (imag/real), so angle1=arctan (4/3) and angle2=arctan (8/6)=arctan (4/3)). Adding complex values, sum=(9+j12), magnitude of which is square_root (81+144)=15.

The sum of the magnitudes is magnitude of (3+j4)+ magnitude of (6+j8)=5+10=15. The quotient is therefore 15/15=1=consistency (before 1/n normalization, would also be 1 after normalization) (Normalized consistency=(1-0.5)/(1-0.5)=1.0).

If one of the above bins has a different angle, say that the second one has complex value (6−j8), which has the same magnitude, 10. The complex sum is now (9−j4), which has magnitude of square_root (81+16)=9.85, so the quotient is 9.85/15=0.66=consistency (before normalization). To normalize, subtract 1/n=1/2, and divide by (1-1/n) (normalized consistency=(0.66-0.5)/(1-0.5)=0.32.)

Although the above-described technique for determining a Subband Angle Consistency Factor has been found useful, its use is not critical. Other suitable techniques may be employed. For example, one could calculate a standard deviation of angles using standard formulae. In any case, it is desirable to employ amplitude weighting to minimize the effect of small signals on the calculated consistency value.

In addition, an alternative derivation of the Subband Angle Consistency Factor may use energy (the squares of the magnitudes) instead of magnitude. This may be accomplished by squaring the magnitude from Step 403 before it is applied to Steps 405 and 407.

Step 411. Derive Subband Decorrelation Scale Factor.

Derive a frame-rate Decorrelation Scale Factor for each subband as follows:

a. Let x=frame-rate Spectral-Steadiness Factor of Step 409*f*.
b. Let y=frame-rate Angle Consistency Factor of Step 410*e*.
c. Then the frame-rate Subband Decorrelation Scale Factor=(1−x)*(1−y), a number between 0 and 1.

Comments Regarding Step 411:

The Subband Decorrelation Scale Factor is a function of the spectral-steadiness of signal characteristics over time in a subband of a channel (the Spectral-Steadiness Factor) and the consistency in the same subband of a channel of bin angles with respect to corresponding bins of a reference channel (the Interchannel Angle Consistency Factor). The Subband Decorrelation Scale Factor is high only if both the Spectral-Steadiness Factor and the Interchannel Angle Consistency Factor are low.

As explained above, the Decorrelation Scale Factor controls the degree of envelope decorrelation provided in the decoder. Signals that exhibit spectral steadiness over time preferably should not be decorrelated by altering their envelopes, regardless of what is happening in other channels, as it may result in audible artifacts, namely wavering or warbling of the signal.

Step 412. Derive Subband Amplitude Scale Factors.

From the subband frame energy values of Step 404 and from the subband frame energy values of all other channels (as may be obtained by a step corresponding to Step 404 or an equivalent thereof), derive frame-rate Subband Amplitude Scale Factors as follows:

a. For each subband, sum the energy values per frame across all input channels.
b. Divide each subband energy value per frame, (from Step 404) by the sum of the energy values across all input channels (from Step 412*a*) to create values in the range of 0 to 1.
c. Convert each ratio to dB, in the range of −∞ to 0.
d. Divide by the scale factor granularity, which may be set at 1.5 dB, for example, change sign to yield a non-negative value, limit to a maximum value which may be, for example, 31 (i.e. 5-bit precision) and round to the nearest integer to create the quantized value. These values are the frame-rate Subband Amplitude Scale Factors and are conveyed as part of the sidechain information.
e. If the coupling frequency of the encoder is below about 1000 Hz, apply the subband frame-averaged or frame-accumulated magnitudes to a time smoother that operates on all subbands below that frequency and above the coupling frequency.

Comments Regarding Step 412*e*:

See comments regarding step 404*c* except that in the case of Step 412*e*, there is no suitable subsequent step in which the time smoothing may alternatively be performed.

Comments for Step 412:

Although the granularity (resolution) and quantization precision indicated here have been found to be useful, they are not critical and other values may provide acceptable results.

Alternatively, one may use amplitude instead of energy to generate the Subband Amplitude Scale Factors. If using amplitude, one would use dB=20*log(amplitude ratio), else if using energy, one converts to dB via dB=10*log(energy ratio), where amplitude ratio=square root (energy ratio).

Step 413. Signal-Dependently Time Smooth Interchannel Subband Phase Angles.

Apply signal-dependent temporal smoothing to subband frame-rate interchannel angles derived in Step 407*f*:

a. Let v=Subband Spectral-Steadiness Factor of Step 409*d*.
b. Let w=corresponding Angle Consistency Factor of Step 410*e*.
c. Let x=(1−v)*w. This is a value between 0 and 1, which is high if the Spectral-Steadiness Factor is low and the Angle Consistency Factor is high.
d. Let y=1−x. y is high if Spectral-Steadiness Factor is high and Angle Consistency Factor is low.
e. Let $z=y^{exp}$, where exp is a constant, which may be=0.1. z is also in the range of 0 to 1, but skewed toward 1, corresponding to a slow time constant.
f. If the Transient Flag (Step 401) for the channel is set, set z=0, corresponding to a fast time constant in the presence of a transient.
g. Compute lim, a maximum allowable value of z, lim=1−(0.1*w). This ranges from 0.9 if the Angle Consistency Factor is high to 1.0 if the Angle Consistency Factor is low (0).
h. Limit z by lim as necessary: if (z>lim) then z=lim.
i. Smooth the subband angle of Step 407*f* using the value of z and a running smoothed value of angle maintained for each subband. If A=angle of Step 407*f* and RSA=running smoothed angle value as of the previous block, and NewRSA is the new value of the running smoothed angle, then: NewRSA=RSA*z+A*(1−z). The value of RSA is subsequently set equal to NewRSA before processing the following block. New RSA is the signal-dependently time-smoothed angle output of Step 413.

Comments Regarding Step 413:

When a transient is detected, the subband angle update time constant is set to 0, allowing a rapid subband angle change. This is desirable because it allows the normal angle update mechanism to use a range of relatively slow time constants, minimizing image wandering during static or quasi-static signals, yet fast-changing signals are treated with fast time constants.

Although other smoothing techniques and parameters may be usable, a first-order smoother implementing Step 413 has been found to be suitable. If implemented as a first-order smoother/lowpass filter, the variable "z" corresponds to the feed-forward coefficient (sometimes denoted "ff0"), while "(1−z)" corresponds to the feedback coefficient (sometimes denoted "fb1").

Step 414. Quantize Smoothed Interchannel Subband Phase Angles.

Quantize the time-smoothed subband interchannel angles derived in Step 413*i* to obtain the Subband Angle Control Parameter:

a. If the value is less than 0, add 2π, so that all angle values to be quantized are in the range 0 to 2π.

b. Divide by the angle granularity (resolution), which may be 2π/64 radians, and round to an integer. The maximum value may be set at 63, corresponding to 6-bit quantization.

Comments Regarding Step 414:

The quantized value is treated as a non-negative integer, so an easy way to quantize the angle is to map it to a non-negative floating point number ((add 2π if less than 0, making the range 0 to (less than) 2π)), scale by the granularity (resolution), and round to an integer. Similarly, dequantizing that integer (which could otherwise be done with a simple table lookup), can be accomplished by scaling by the inverse of the angle granularity factor, converting a non-negative integer to a non-negative floating point angle (again, range 0 to 2π), after which it can be renormalized to the range ±π for further use. Although such quantization of the Subband Angle Control Parameter has been found to be useful, such a quantization is not critical and other quantizations may provide acceptable results.

Step 415. Quantize Subband Decorrelation Scale Factors.

Quantize the Subband Decorrelation Scale Factors produced by Step 411 to, for example, 8 levels (3 bits) by multiplying by 7.49 and rounding to the nearest integer. These quantized values are part of the sidechain information.

Comments Regarding Step 415:

Although such quantization of the Subband Decorrelation Scale Factors has been found to be useful, quantization using the example values is not critical and other quantizations may provide acceptable results.

Step 416. Dequantize Subband Angle Control Parameters.

Dequantize the Subband Angle Control Parameters (see Step 414), to use prior to downmixing.

Comment Regarding Step 416:

Use of quantized values in the encoder helps maintain synchrony between the encoder and the decoder.

Step 417. Distribute Frame-Rate Dequantized Subband Angle Control Parameters Across Blocks.

In preparation for downmixing, distribute the once-per-frame dequantized Subband Angle Control Parameters of Step 416 across time to the subbands of each block within the frame.

Comment Regarding Step 417:

The same frame value may be assigned to each block in the frame. Alternatively, it may be useful to interpolate the Subband Angle Control Parameter values across the blocks in a frame. Linear interpolation over time may be employed in the manner of the linear interpolation across frequency, as described below.

Step 418. Interpolate Block Subband Angle Control Parameters to Bins

Distribute the block Subband Angle Control Parameters of Step 417 for each channel across frequency to bins, preferably using linear interpolation as described below.

Comment Regarding Step 418:

If linear interpolation across frequency is employed, Step 418 minimizes phase angle changes from bin to bin across a subband boundary, thereby minimizing aliasing artifacts. Such linear interpolation may be enabled, for example, as described below following the description of Step 422. Subband angles are calculated independently of one another, each representing an average across a subband. Thus, there may be a large change from one subband to the next. If the net angle value for a subband is applied to all bins in the subband (a "rectangular" subband distribution), the entire phase change from one subband to a neighboring subband occurs between two bins. If there is a strong signal component there, there may be severe, possibly audible, aliasing. Linear interpolation, between the centers of each subband, for example, spreads the phase angle change over all the bins in the subband, minimizing the change between any pair of bins, so that, for example, the angle at the low end of a subband mates with the angle at the high end of the subband below it, while maintaining the overall average the same as the given calculated subband angle. In other words, instead of rectangular subband distributions, the subband angle distribution may be trapezoidally shaped.

For example, suppose that the lowest coupled subband has one bin and a subband angle of 20 degrees, the next subband has three bins and a subband angle of 40 degrees, and the third subband has five bins and a subband angle of 100 degrees. With no interpolation, assume that the first bin (one subband) is shifted by an angle of 20 degrees, the next three bins (another subband) are shifted by an angle of 40 degrees and the next five bins (a further subband) are shifted by an angle of 100 degrees. In that example, there is a 60-degree maximum change, from bin 4 to bin 5. With linear interpolation, the first bin still is shifted by an angle of 20 degrees, the next 3 bins are shifted by about 30, 40, and 50 degrees; and the next five bins are shifted by about 67, 83, 100, 117, and 133 degrees. The average subband angle shift is the same, but the maximum bin-to-bin change is reduced to 17 degrees.

Optionally, changes in amplitude from subband to subband, in connection with this and other steps described herein, such as Step 417 may also be treated in a similar interpolative fashion. However, it may not be necessary to do so because there tends to be more natural continuity in amplitude from one subband to the next.

Step 419. Apply Phase Angle Rotation to Bin Transform Values for Channel.

Apply phase angle rotation to each bin transform value as follows:

a. Let x=bin angle for this bin as calculated in Step 418.

b. Let y=−x;

c. Compute z, a unity-magnitude complex phase rotation scale factor with angle y, z=cos(y)+j sin(y).

d. Multiply the bin value (a+jb) by z.

Comments Regarding Step 419:

The phase angle rotation applied in the encoder is the inverse of the angle derived from the Subband Angle Control Parameter.

Phase angle adjustments, as described herein, in an encoder or encoding process prior to downmixing (Step 420) have several advantages: (1) they minimize cancellations of the channels that are summed to a mono composite signal or matrixed to multiple channels, (2) they minimize reliance on energy normalization (Step 421), and (3) they precompensate the decoder inverse phase angle rotation, thereby reducing aliasing.

The phase correction factors can be applied in the encoder by subtracting each subband phase correction value from the angles of each transform bin value in that subband. This is equivalent to multiplying each complex bin value by a complex number with a magnitude of 1.0 and an angle equal to the negative of the phase correction factor. Note that a complex number of magnitude 1, angle A is equal to cos(A)+j sin(A). This latter quantity is calculated once for each subband of each channel, with A=−phase correction for this subband, then multiplied by each bin complex signal value to realize the phase shifted bin value.

The phase shift is circular, resulting in circular convolution (as mentioned above). While circular convolution may be benign for some continuous signals, it may create spurious spectral components for certain continuous complex signals (such as a pitch pipe) or may cause blurring of transients if different phase angles are used for different subbands. Consequently, a suitable technique to avoid circular convolution may be employed or the Transient Flag may be employed such that, for example, when the Transient Flag is True, the angle calculation results may be overridden, and all subbands in a channel may use the same phase correction factor such as zero or a randomized value.

Step 420. Downmix.

Downmix to mono by adding the corresponding complex transform bins across channels to produce a mono composite channel or downmix to multiple channels by matrixing the input channels, as for example, in the manner of the example of FIG. 6, as described below.

Comments Regarding Step 420:

In the encoder, once the transform bins of all the channels have been phase shifted, the channels are summed, bin-by-bin, to create the mono composite audio signal. Alternatively, the channels may be applied to a passive or active matrix that provides either a simple summation to one channel, as in the N:1 encoding of FIG. 1, or to multiple channels. The matrix coefficients may be real or complex (real and imaginary).

Step 421. Normalize.

To avoid cancellation of isolated bins and over-emphasis of in-phase signals, normalize the amplitude of each bin of the mono composite channel to have substantially the same energy as the sum of the contributing energies, as follows:

a. Let x=the sum across channels of bin energies (i.e., the squares of the bin magnitudes computed in Step 403).

b. Let y=energy of corresponding bin of the mono composite channel, calculated as per Step 403.

c. Let z=scale factor=square_root (x/y). If x=0 then y is 0 and z is set to 1.

d. Limit z to a maximum value of, for example, 100. If z is initially greater than 100 (implying strong cancellation from downmixing), add an arbitrary value, for example, 0.01*square_root (x) to the real and imaginary parts of the mono composite bin, which will assure that it is large enough to be normalized by the following step.

e. Multiply the complex mono composite bin value by z.

Comments Regarding Step 421:

Although it is generally desirable to use the same phase factors for both encoding and decoding, even the optimal choice of a subband phase correction value may cause one or more audible spectral components within the subband to be cancelled during the encode downmix process because the phase shifting of step 419 is performed on a subband rather than a bin basis. In this case, a different phase factor for isolated bins in the encoder may be used if it is detected that the sum energy of such bins is much less than the energy sum of the individual channel bins at that frequency. It is generally not necessary to apply such an isolated correction factor to the decoder, inasmuch as isolated bins usually have little effect on overall image quality. A similar normalization may be applied if multiple channels rather than a mono channel are employed.

Step 422. Assemble and Pack into Bitstream(s).

The Amplitude Scale Factors, Angle Control Parameters, Decorrelation Scale Factors, and Transient Flags side channel information for each channel, along with the common mono composite audio or the matrixed multiple channels are multiplexed as may be desired and packed into one or more bitstreams suitable for the storage, transmission or storage and transmission medium or media.

Comment Regarding Step 422:

The mono composite audio or the multiple channel audio may be applied to a data-rate reducing encoding process or device such as, for example, a perceptual encoder or to a perceptual encoder and an entropy coder (e.g., arithmetic or Huffman coder) (sometimes referred to as a "lossless" coder) prior to packing. Also, as mentioned above, the mono composite audio (or the multiple channel audio) and related sidechain information may be derived from multiple input channels only for audio frequencies above a certain frequency (a "coupling" frequency). In that case, the audio frequencies below the coupling frequency in each of the multiple input channels may be stored, transmitted or stored and transmitted as discrete channels or may be combined or processed in some manner other than as described herein. Discrete or otherwise-combined channels may also be applied to a data reducing encoding process or device such as, for example, a perceptual encoder or a perceptual encoder and an entropy encoder. The mono composite audio (or the multiple channel audio) and the discrete multichannel audio may all be applied to an integrated perceptual encoding or perceptual and entropy encoding process or device prior to packing.

Optional Interpolation Flag (not Shown in FIG. 4)

Interpolation across frequency of the basic phase angle shifts provided by the Subband Angle Control Parameters may be enabled in the Encoder (Step 418) and/or in the Decoder (Step 505, below). The optional Interpolation Flag sidechain parameter may be employed for enabling interpolation in the Decoder. Either the Interpolation Flag or an enabling flag similar to the Interpolation Flag may be used in the Encoder. Note that because the Encoder has access to data at the bin level, it may use different interpolation values than the Decoder, which interpolates the Subband Angle Control Parameters in the sidechain information.

The use of such interpolation across frequency in the Encoder or the Decoder may be enabled if, for example, either of the following two conditions are true:

Condition 1. If a strong, isolated spectral peak is located at or near the boundary of two subbands that have substantially different phase rotation angle assignments.

Reason: without interpolation, a large phase change at the boundary may introduce a warble in the isolated spectral component. By using interpolation to spread the band-to-band phase change across the bin values within the band, the amount of change at the subband boundaries is reduced. Thresholds for spectral peak strength, closeness to a boundary and difference in phase rotation from subband to subband to satisfy this condition may be adjusted empirically.

Condition 2. If, depending on the presence of a transient, either the interchannel phase angles (no transient) or the absolute phase angles within a channel (transient), comprise a good fit to a linear progression.

Reason: Using interpolation to reconstruct the data tends to provide a better fit to the original data. Note that the slope of the linear progression need not be constant across all frequencies, only within each subband, since angle data will still be conveyed to the decoder on a subband basis; and that forms the input to the Interpolator Step 418. The degree to which the data provides a good fit to satisfy this condition may also be determined empirically.

Other conditions, such as those determined empirically, may benefit from interpolation across frequency. The existence of the two conditions just mentioned may be determined as follows:

Condition 1. If a strong, isolated spectral peak is located at or near the boundary of two subbands that have substantially different phase rotation angle assignments:

for the Interpolation Flag to be used by the Decoder, the Subband Angle Control Parameters (output of Step 414), and for enabling of Step 418 within the Encoder, the output of Step 413 before quantization may be used to determine the rotation angle from subband to subband.

for both the Interpolation Flag and for enabling within the Encoder, the magnitude output of Step 403, the current DFT magnitudes, may be used to find isolated peaks at subband boundaries.

Condition 2. If, depending on the presence of a transient, either the interchannel phase angles (no transient) or the absolute phase angles within a channel (transient), comprise a good fit to a linear progression:

if the Transient Flag is not true (no transient), use the relative interchannel bin phase angles from Step 406 for the fit to a linear progression determination, and if the Transient Flag is true (transient), us the channel's absolute phase angles from Step 403.

Decoding

The steps of a decoding process ("decoding steps") may be described as follows. With respect to decoding steps, reference is made to FIG. 5, which is in the nature of a hybrid flowchart and functional block diagram. For simplicity, the figure shows the derivation of sidechain information components for one channel, it being understood that sidechain information components must be obtained for each channel unless the channel is a reference channel for such components, as explained elsewhere.

Step 501. Unpack and Decode Sidechain Information.

Unpack and decode (including dequantization), as necessary, the sidechain data components (Amplitude Scale Factors, Angle Control Parameters, Decorrelation Scale Factors, and Transient Flag) for each frame of each channel (one channel shown in FIG. 5). Table lookups may be used to decode the Amplitude Scale Factors, Angle Control Parameter, and Decorrelation Scale Factors.

Comment Regarding Step 501:

As explained above, if a reference channel is employed, the sidechain data for the reference channel may not include the Angle Control Parameters, Decorrelation Scale Factors, and Transient Flag.

Step 502. Unpack and Decode Mono Composite or Multichannel Audio Signal.

Unpack and decode, as necessary, the mono composite or multichannel audio signal information to provide DFT coefficients for each transform bin of the mono composite or multichannel audio signal.

Comment Regarding Step 502:

Step 501 and Step 502 may be considered to be part of a single unpacking and decoding step. Step 502 may include a passive or active matrix.

Step 503. Distribute Angle Parameter Values Across Blocks.

Block Subband Angle Control Parameter values are derived from the dequantized frame Subband Angle Control Parameter values.

Comment Regarding Step 503:

Step 503 may be implemented by distributing the same parameter value to every block in the frame.

Step 504. Distribute Subband Decorrelation Scale Factor Across Blocks.

Block Subband Decorrelation Scale Factor values are derived from the dequantized frame Subband Decorrelation Scale Factor values.

Comment Regarding Step 504:

Step 504 may be implemented by distributing the same scale factor value to every block in the frame.

Step 505. Linearly Interpolate Across Frequency.

Optionally, derive bin angles from the block subband angles of decoder Step 503 by linear interpolation across frequency as described above in connection with encoder Step 418. Linear interpolation in Step 505 may be enabled when the Interpolation Flag is used and is true.

Step 506. Add Randomized Phase Angle Offset (Technique 3).

In accordance with Technique 3, described above, when the Transient Flag indicates a transient, add to the block Subband Angle Control Parameter provided by Step 503, which may have been linearly interpolated across frequency by Step 505, a randomized offset value scaled by the Decorrelation Scale Factor (the scaling may be indirect as set forth in this Step):

a. Let y=block Subband Decorrelation Scale Factor.

b. Let $z=y^{exp}$, where exp is a constant, for example=5. z will also be in the range of 0 to 1, but skewed toward 0, reflecting a bias toward low levels of randomized variation unless the Decorrelation Scale Factor value is high.

c. Let x=a randomized number between +1.0 and 1.0, chosen separately for each subband of each block.

d. Then, the value added to the block Subband Angle Control Parameter to add a randomized angle offset value according to Technique 3 is x*pi*z.

Comments Regarding Step 506:

As will be appreciated by those of ordinary skill in the art, "randomized" angles (or "randomized amplitudes if amplitudes are also scaled) for scaling by the Decorrelation Scale Factor may include not only pseudo-random and truly random variations, but also deterministically-generated variations that, when applied to phase angles or to phase angles and to amplitudes, have the effect of reducing cross-correlation between channels. Such "randomized" variations may be obtained in many ways. For example, a pseudo-random number generator with various seed values may be employed. Alternatively, truly random numbers may be generated using a hardware random number generator. Inasmuch as a randomized angle resolution of only about 1 degree may be sufficient, tables of randomized numbers having two or three decimal places (e.g. 0.84 or 0.844) may be employed. Preferably, the randomized values (between −1.0 and +1.0 with reference to Step 505*c*, above) are uniformly distributed statistically across each channel.

Although the non-linear indirect scaling of Step 506 has been found to be useful, it is not critical and other suitable scalings may be employed—in particular other values for the exponent may be employed to obtain similar results.

When the Subband Decorrelation Scale Factor value is 1, a full range of random angles from −π to +π are added (in which case the block Subband Angle Control Parameter values produced by Step 503 are rendered irrelevant). As the Subband Decorrelation Scale Factor value decreases toward zero, the randomized angle offset also decreases toward zero, causing the output of Step 506 to move toward the Subband Angle Control Parameter values produced by Step 503.

If desired, the encoder described above may also add a scaled randomized offset in accordance with Technique 3 to the angle shift applied to a channel before downmixing. Doing so may improve alias cancellation in the decoder. It may also be beneficial for improving the synchronicity of the encoder and decoder.

Step 507. Add Randomized Phase Angle Offset (Technique 2).

In accordance with Technique 2, described above, when the Transient Flag does not indicate a transient, for each bin, add to all the block Subband Angle Control Parameters in a frame provided by Step 503 (Step 505 operates only when the Transient Flag indicates a transient) a different randomized offset value scaled by the Decorrelation Scale Factor (the scaling may be direct as set forth herein in this step):

a. Let y=block Subband Decorrelation Scale Factor.

b. Let x=a randomized number between +1.0 and −1.0, chosen separately for each bin of each frame.

c. Then, the value added to the block bin Angle Control Parameter to add a randomized angle offset value according to Technique 3 is x*pi*y.

Comments Regarding Step 507:

See comments above regarding Step 505 regarding the randomized angle offset.

Although the direct scaling of Step 507 has been found to be useful, it is not critical and other suitable scalings may be employed.

To minimize temporal discontinuities, the unique randomized angle value for each bin of each channel preferably does not change with time. The randomized angle values of all the bins in a subband are scaled by the same Subband Decorrelation Scale Factor value, which is updated at the frame rate. Thus, when the Subband Decorrelation Scale Factor value is 1, a full range of random angles from −π to +π are added (in which case block subband angle values derived from the dequantized frame subband angle values are rendered irrelevant). As the Subband Decorrelation Scale Factor value diminishes toward zero, the randomized angle offset also diminishes toward zero. Unlike Step 504, the scaling in this Step 507 may be a direct function of the Subband Decorrelation Scale Factor value. For example, a Subband Decorrelation Scale Factor value of 0.5 proportionally reduces every random angle variation by 0.5.

The scaled randomized angle value may then be added to the bin angle from decoder Step 506. The Decorrelation Scale Factor value is updated once per frame. In the presence of a Transient Flag for the frame, this step is skipped, to avoid transient prenoise artifacts.

If desired, the encoder described above may also add a scaled randomized offset in accordance with Technique 2 to the angle shift applied before downmixing. Doing so may improve alias cancellation in the decoder. It may also be beneficial for improving the synchronicity of the encoder and decoder.

Step 508. Normalize Amplitude Scale Factors.

Normalize Amplitude Scale Factors across channels so that they sum-square to 1.

Comment Regarding Step 508:

For example, if two channels have dequantized scale factors of −3.0 dB (=2*granularity of 1.5 dB) (0.70795), the sum of the squares is 1.002. Dividing each by the square root of 1.002=1.001 yields two values of 0.7072 (−3.01 dB).

Step 509. Boost Subband Scale Factor Levels (Optional).

Optionally, when the Transient Flag indicates no transient, apply a slight additional boost to Subband Scale Factor levels, dependent on Subband Decorrelation Scale Factor levels: multiply each normalized Subband Amplitude Scale Factor by a small factor (e.g., 1+0.2*Subband Decorrelation Scale Factor). When the Transient Flag is True, skip this step.

Comment Regarding Step 509:

This step may be useful because the decoder decorrelation Step 507 may result in slightly reduced levels in the final inverse filterbank process.

Step 510. Distribute Subband Amplitude Values Across Bins.

Step 510 may be implemented by distributing the same subband amplitude scale factor value to every bin in the subband.

Step 510*a*. Add Randomized Amplitude Offset (Optional)

Optionally, apply a randomized variation to the normalized Subband Amplitude Scale Factor dependent on Subband Decorrelation Scale Factor levels and the Transient Flag. In the absence of a transient, add a Randomized Amplitude Scale Factor that does not change with time on a bin-by-bin basis (different from bin to bin), and, in the presence of a transient (in the frame or block), add a Randomized Amplitude Scale Factor that changes on a block-by-block basis (different from block to block) and changes from subband to subband (the same shift for all bins in a subband; different from subband to subband). Step 510*a* is not shown in the drawings.

Comment Regarding Step 510*a*:

Although the degree to which randomized amplitude shifts are added may be controlled by the Decorrelation Scale Factor, it is believed that a particular scale factor value should cause less amplitude shift than the corresponding randomized phase shift resulting from the same scale factor value in order to avoid audible artifacts.

Step 511. Upmix.

a. For each bin of each output channel, construct a complex upmix scale factor from the amplitude of decoder Step 508 and the bin angle of decoder Step 507: (amplitude*(cos (angle)+j sin (angle)).

b. For each output channel, multiply the complex bin value and the complex upmix scale factor to produce the upmixed complex output bin value of each bin of the channel.

Step 512. Perform Inverse DFT (Optional).

Optionally, perform an inverse DFT transform on the bins of each output channel to yield multichannel output PCM values. As is well known, in connection with such an inverse DFT transformation, the individual blocks of time samples are windowed, and adjacent blocks are overlapped and added together in order to reconstruct the final continuous time output PCM audio signal.

Comments Regarding Step 512:

A decoder according to the present invention may not provide PCM outputs. In the case where the decoder process is employed only above a given coupling frequency, and discrete MDCT coefficients are sent for each channel below that frequency, it may be desirable to convert the DFT coefficients derived by the decoder upmixing Steps 511*a* and 511*b* to MDCT coefficients, so that they can be combined with the lower frequency discrete MDCT coefficients and requantized in order to provide, for example, a bitstream compatible with an encoding system that has a large number of installed users, such as a standard AC-3 SP/DIF bitstream for application to an external device where an inverse transform may be performed. An inverse DFT transform may be applied to ones of the output channels to provide PCM outputs.

Section 8.2.2 of the A/52A Document With Sensitivity Factor "F" Added 8.2.2. Transient Detection Transients are detected in the full-bandwidth channels in order to decide when to switch to short length audio blocks to improve pre-echo performance High-pass filtered versions of the signals are examined for an increase in energy from one sub-block time-segment to the next. Sub-blocks are examined at different time scales. If a transient is detected in the second half of an audio block in a channel that channel switches to a short block. A channel that is block-switched uses the D45 exponent strategy [i.e., the data has a coarser frequency resolution in order to reduce the data overhead resulting from the increase in temporal resolution].

The transient detector is used to determine when to switch from a long transform block (length 512), to the short block (length 256). It operates on 512 samples for every audio block. This is done in two passes, with each pass processing 256 samples. Transient detection is broken down into four steps: 1) high-pass filtering, 2) segmentation of the block into submultiples, 3) peak amplitude detection within each sub-block segment, and 4) threshold comparison. The transient detector outputs a flag blksw[n] for each full-bandwidth channel, which when set to "one" indicates the presence of a transient in the second half of the 512 length input block for the corresponding channel 1) High-pass filtering: The high-pass filter is implemented as a cascaded biquad direct form II IIR filter with a cutoff of 8 kHz.
2) Block Segmentation: The block of 256 high-pass filtered samples are segmented into a hierarchical tree of levels in which level 1 represents the 256 length block, level 2 is two segments of length 128, and level 3 is four segments of length 64.
3) Peak Detection: The sample with the largest magnitude is identified for each segment on every level of the hierarchical tree. The peaks for a single level are found as follows:

$$P[j][k]=\max(x(n))$$

$$\text{for } n=(512\times(k-1)/2\hat{\ }j),(512\times(k-1)/2\hat{\ }j)+1, \ldots (512\times k/2\hat{\ }j)-1$$

$$\text{and } k=1, \ldots, 2\hat{\ }(j-1);$$

where: x(n)=the nth sample in the 256 length block j=1, 2, 3 is the hierarchical level number k=the segment number within level j Note that P[j][0], (i.e., k=0) is defined to be the peak of the last segment on level j of the tree calculated immediately prior to the current tree.

For example, P[3][4] in the preceding tree is P[3][0] in the current tree.

4) Threshold Comparison: The first stage of the threshold comparator checks to see if there is significant signal level in the current block. This is done by comparing the overall peak value P[1][1] of the current block to a "silence threshold". If P[1][1] is below this threshold then a long block is forced. The silence threshold value is 100/32768. The next stage of the comparator checks the relative peak levels of adjacent segments on each level of the hierarchical tree. If the peak ratio of any two adjacent segments on a particular level exceeds a pre-defined threshold for that level, then a flag is set to indicate the presence of a transient in the current 256-length block. The ratios are compared as follows:

$$mag(P[j][k])\times T[j]>(F*mag(P[j][(k-1)]))$$ [Note the "*F*" sensitivity factor]

where: T[j] is the pre-defined threshold for level j, defined as:

T[1]=0.1

T[2]=0.075

T[3]=0.05

If this inequality is true for any two segment peaks on any level, then a transient is indicated for the first half of the 512 length input block. The second pass through this process determines the presence of transients in the second half of the 512 length input block.

N:M Encoding

Aspects of the present invention are not limited to N:1 encoding as described in connection with FIG. 1. More generally, aspects of the invention are applicable to the transformation of any number of input channels (n input channels) to any number of output channels (m output channels) in the manner of FIG. 6 (i.e., N:M encoding). Because in many common applications the number of input channels n is greater than the number of output channels m, the N:M encoding arrangement of FIG. 6 will be referred to as "downmixing" for convenience in description.

Figure 6:
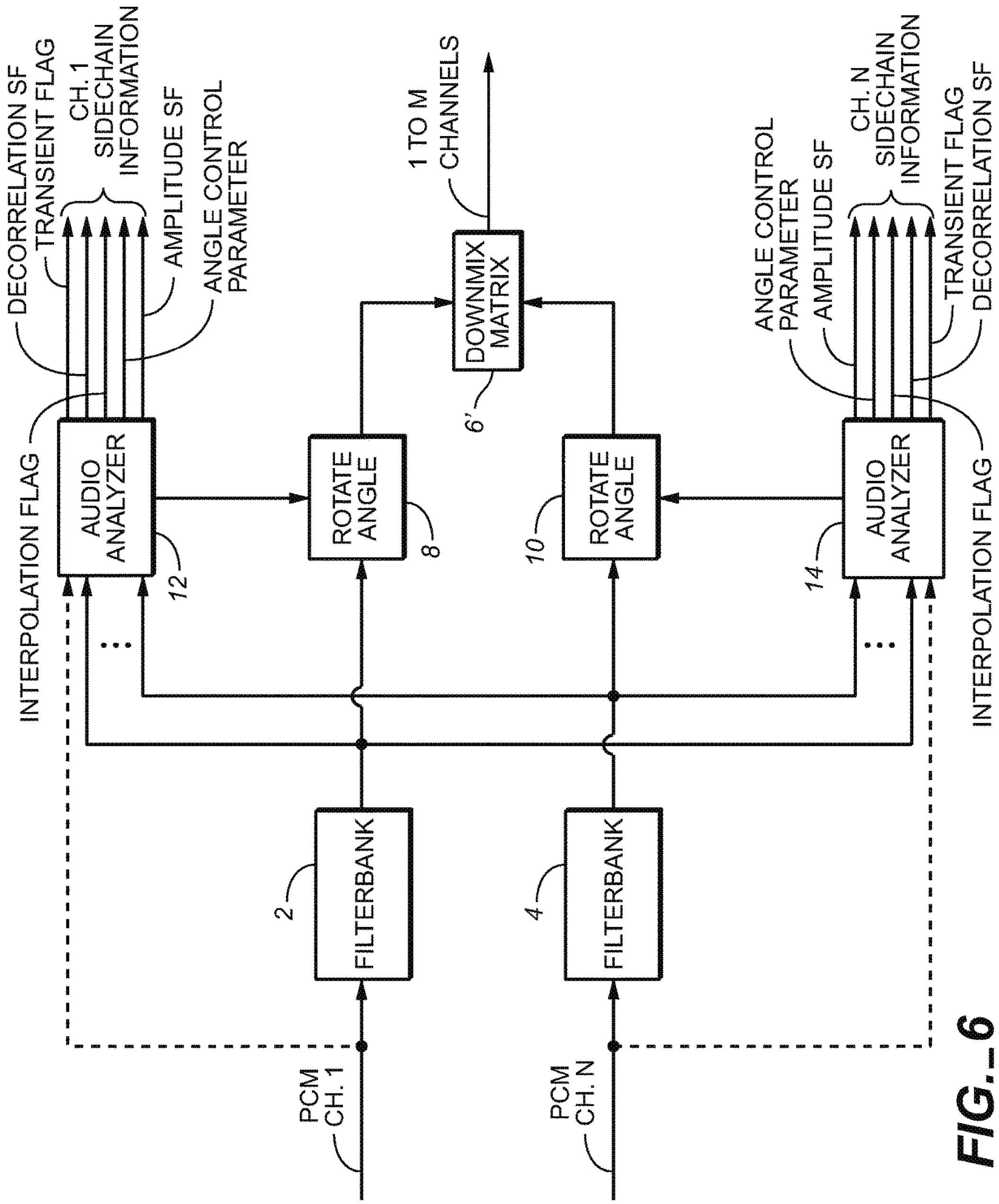
FIG. 6 is an idealized block diagram showing the principal functions or devices of a first N:x encoding arrangement embodying aspects of the present invention.

Referring to the details of FIG. 6, instead of summing the outputs of Rotate Angle 8 and Rotate Angle 10 in the Additive Combiner 6 as in the arrangement of FIG. 1, those outputs may be applied to a downmix matrix device or function 6' ("Downmix Matrix"). Downmix Matrix 6' may be a passive or active matrix that provides either a simple summation to one channel, as in the N:1 encoding of FIG. 1, or to multiple channels. The matrix coefficients may be real or complex (real and imaginary). Other devices and functions in FIG. 6 may be the same as in the FIG. 1 arrangement and they bear the same reference numerals.

Downmix Matrix 6' may provide a hybrid frequency-dependent function such that it provides, for example, $m_{f1\text{-}f2}$ channels in a frequency range f1 to f2 and $m_{f2\text{-}f3}$ channels in a frequency range f2 to f3. For example, below a coupling frequency of, for example, 1000 Hz the Downmix Matrix 6' may provide two channels and above the coupling frequency the Downmix Matrix 6' may provide one channel. By employing two channels below the coupling frequency, better spatial fidelity may be obtained, especially if the two channels represent horizontal directions (to match the horizontality of the human ears).

Although FIG. 6 shows the generation of the same sidechain information for each channel as in the FIG. 1 arrangement, it may be possible to omit certain ones of the sidechain information when more than one channel is provided by the output of the Downmix Matrix 6'. In some cases, acceptable results may be obtained when only the amplitude scale factor sidechain information is provided by the FIG. 6 arrangement. Further details regarding sidechain options are discussed below in connection with the descriptions of FIGS. 7, 8 and 9.

As just mentioned above, the multiple channels generated by the Downmix Matrix 6' need not be fewer than the number of input channels n. When the purpose of an encoder such as in FIG. 6 is to reduce the number of bits for transmission or storage, it is likely that the number of channels produced by downmix matrix 6' will be fewer than the number of input channels n. However, the arrangement of FIG. 6 may also be used as an "upmixer." In that case, there may be applications in which the number of channels m produced by the Downmix Matrix 6' is more than the number of input channels n.

Encoders as described in connection with the examples of FIGS. 2, 5 and 6 may also include their own local decoder or decoding function in order to determine if the audio information and the sidechain information, when decoded by such a decoder, would provide suitable results. The results of such a determination could be used to improve the parameters by employing, for example, a recursive process. In a block encoding and decoding system, recursion calculations could be performed, for example, on every block before the next block ends in order to minimize the delay in transmitting a block of audio information and its associated spatial parameters.

An arrangement in which the encoder also includes its own decoder or decoding function could also be employed advantageously when spatial parameters are not stored or sent only for certain blocks. If unsuitable decoding would result from not sending spatial-parameter sidechain information, such sidechain information would be sent for the particular block. In this case, the decoder may be a modification of the decoder or decoding function of FIG. 2, 5 or 6 in that the decoder would have both the ability to recover spatial-parameter sidechain information for frequencies above the coupling frequency from the incoming bitstream but also to generate simulated spatial-parameter sidechain information from the stereo information below the coupling frequency.

In a simplified alternative to such local-decoder-incorporating encoder examples, rather than having a local decoder or decoder function, the encoder could simply check to determine if there were any signal content below the coupling frequency (determined in any suitable way, for example, a sum of the energy in frequency bins through the frequency range), and, if not, it would send or store spatial-parameter sidechain information rather than not doing so if the energy were above the threshold. Depending on the encoding scheme, low signal information below the coupling frequency may also result in more bits being available for sending sidechain information.

M:N Decoding

Figure 7:
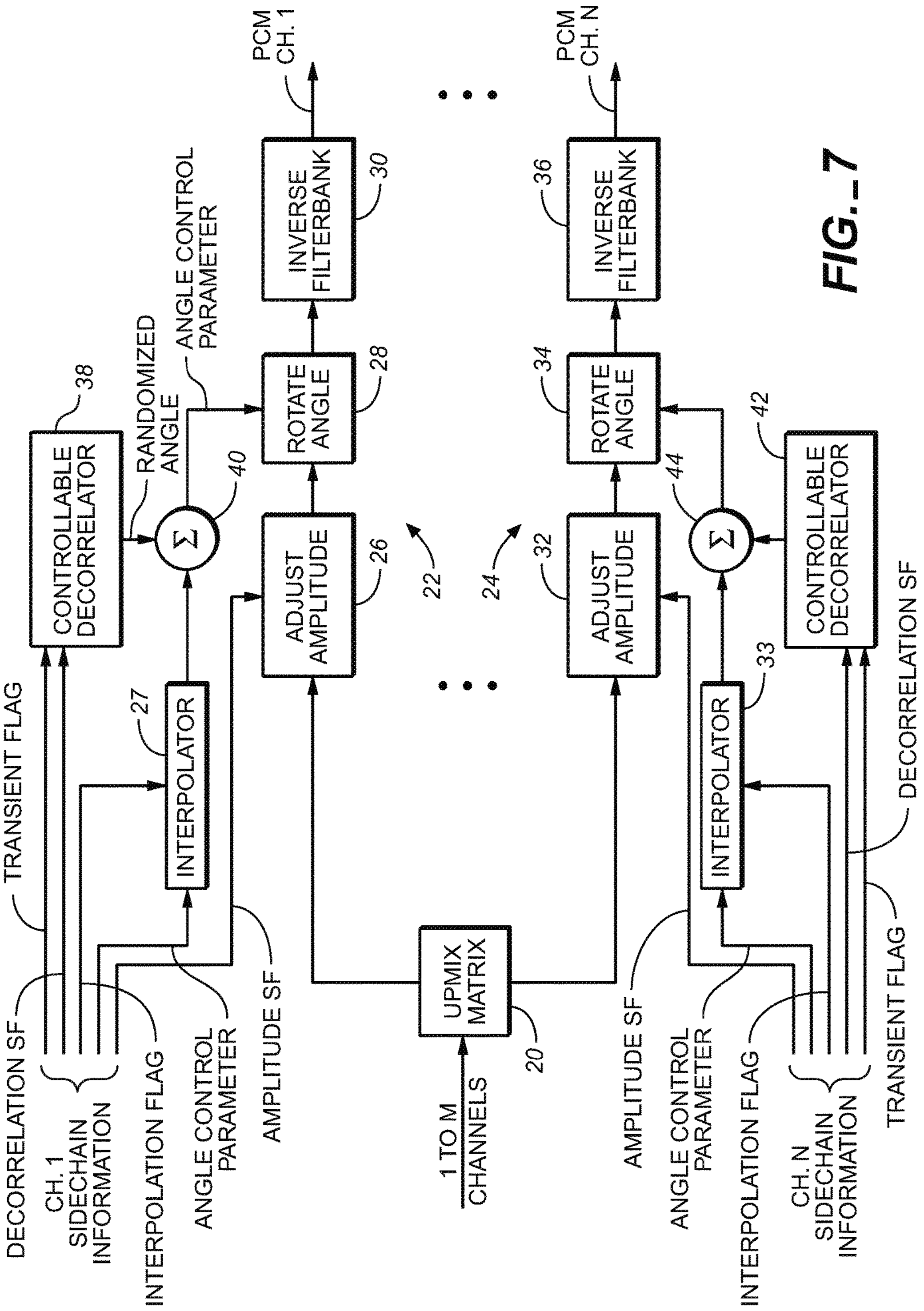
FIG. 7 is an idealized block diagram showing the principal functions or devices of an x:M decoding arrangement embodying aspects of the present invention.

A more generalized form of the arrangement of FIG. 2 is shown in FIG. 7, wherein an upmix matrix function or device ("Upmix Matrix") 20 receives the 1 to m channels generated by the arrangement of FIG. 6. The Upmix Matrix 20 may be a passive matrix. It may be, but need not be, the conjugate transposition (i.e., the complement) of the Downmix Matrix 6' of the FIG. 6 arrangement. Alternatively, the Upmix Matrix 20 may be an active matrix—a variable matrix or a passive matrix in combination with a variable matrix. If an active matrix decoder is employed, in its relaxed or quiescent state it may be the complex conjugate of the Downmix Matrix or it may be independent of the Downmix Matrix. The sidechain information may be applied as shown in FIG. 7 so as to control the Adjust Amplitude, Rotate Angle, and (optional) Interpolator functions or devices. In that case, the Upmix Matrix, if an active matrix, operates independently of the sidechain information and responds only to the channels applied to it. Alternatively, some or all of the sidechain information may be applied to the active matrix to assist its operation. In that case, some or all of the Adjust Amplitude, Rotate Angle, and Interpolator functions or devices may be omitted. The Decoder example of FIG. 7 may also employ the alternative of applying a degree of randomized amplitude variations under certain signal conditions, as described above in connection with FIGS. 2 and 5.

When Upmix Matrix 20 is an active matrix, the arrangement of FIG. 7 may be characterized as a "hybrid matrix decoder" for operating in a "hybrid matrix encoder/decoder system." "Hybrid" in this context refers to the fact that the decoder may derive some measure of control information from its input audio signal (i.e., the active matrix responds to spatial information encoded in the channels applied to it) and a further measure of control information from spatial-parameter sidechain information. Other elements of FIG. 7 are as in the arrangement of FIG. 2 and bear the same reference numerals.

Suitable active matrix decoders for use in a hybrid matrix decoder may include active matrix decoders such as those mentioned above and incorporated by reference, including, for example, matrix decoders known as "Pro Logic" and "Pro Logic II" decoders ("Pro Logic" is a trademark of Dolby Laboratories Licensing Corporation).

Alternative Decorrelation

Figure 8:
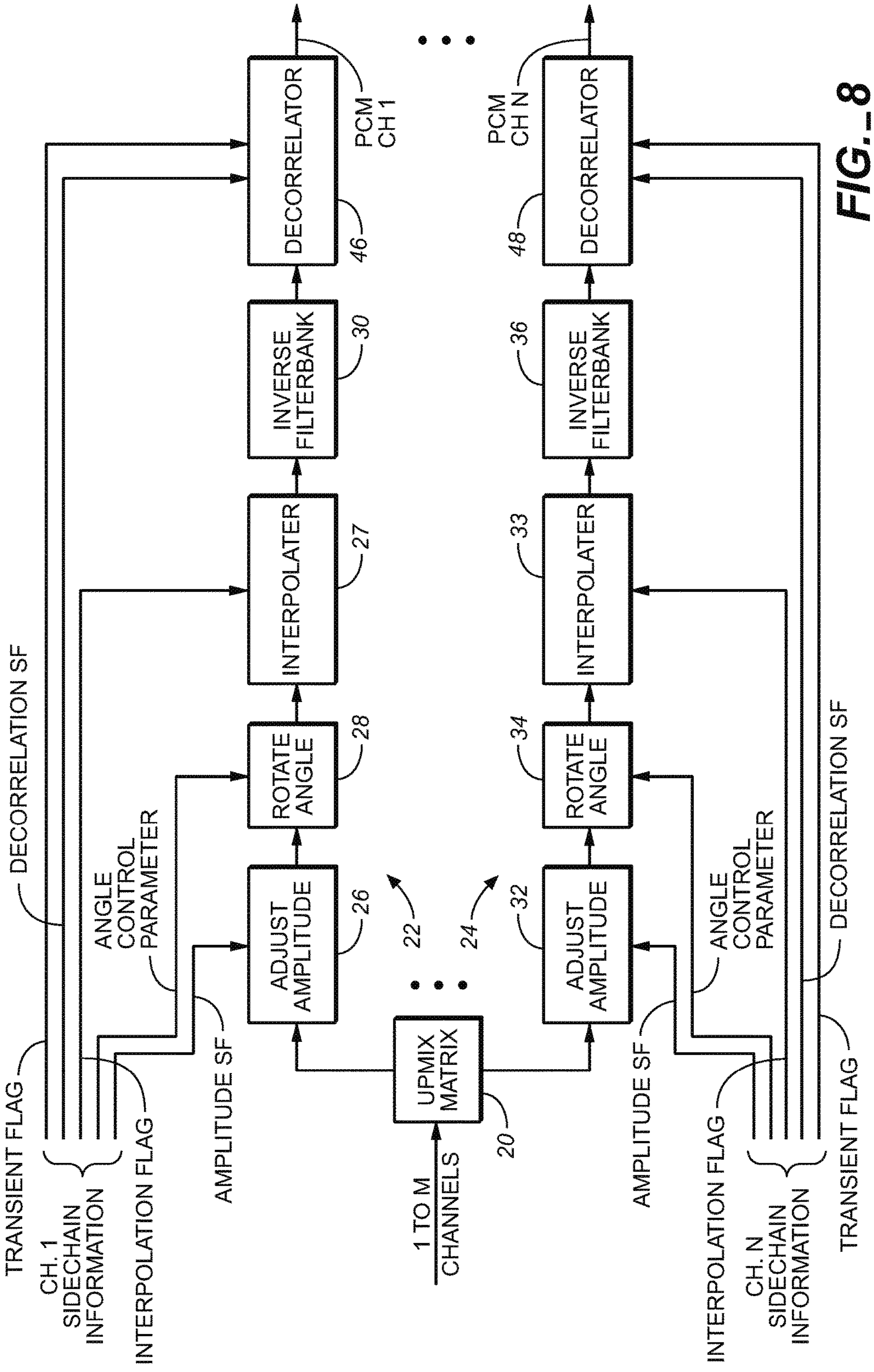
FIG. 8 is an idealized block diagram showing the principal functions or devices of a first alternative x:M decoding arrangement embodying aspects of the present invention.
Figure 9:
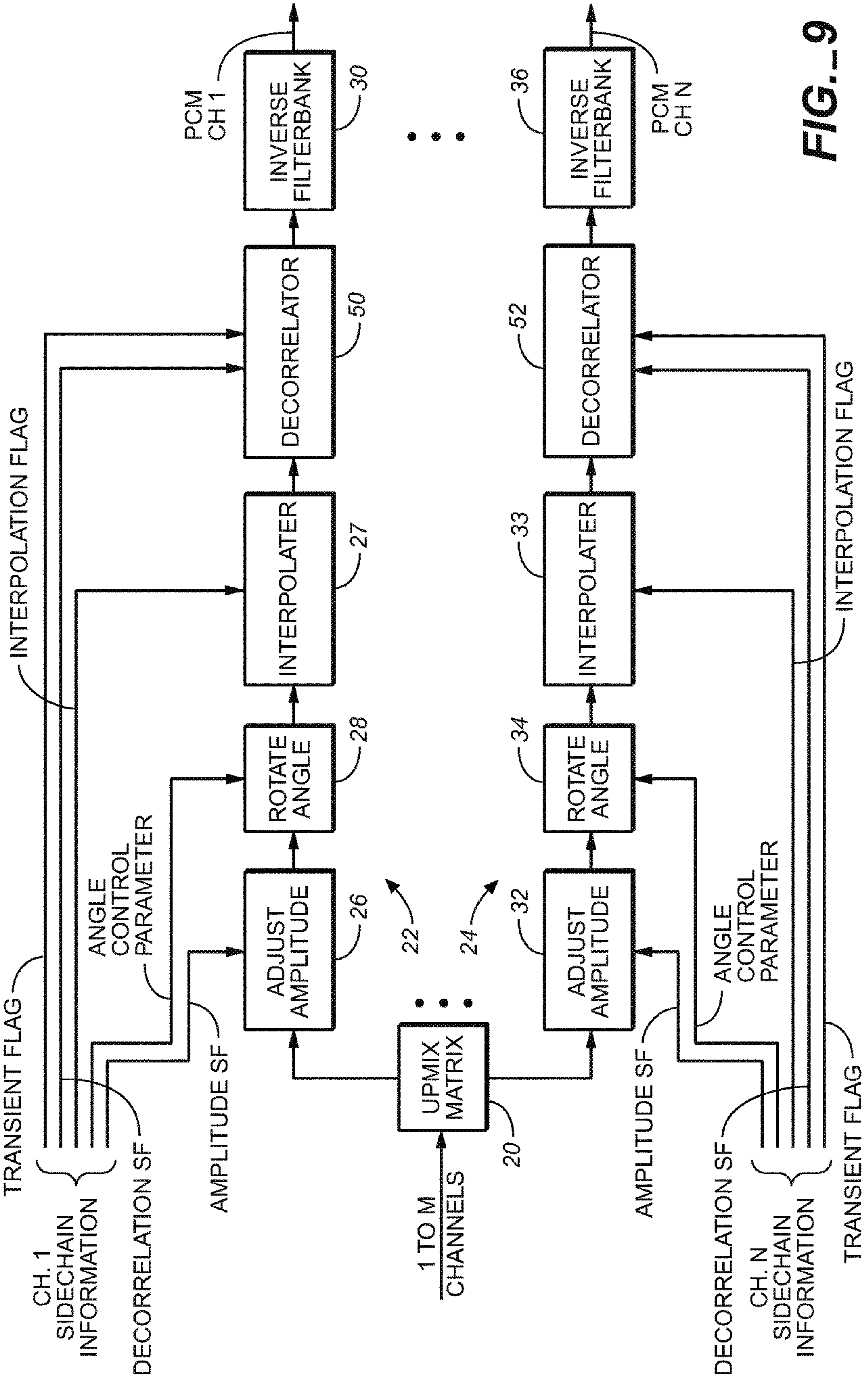
FIG. 9 is an idealized block diagram showing the principal functions or devices of a second alternative x:M decoding arrangement embodying aspects of the present invention.

FIGS. 8 and 9 show variations on the generalized Decoder of FIG. 7. In particular, both the arrangement of FIG. 8 and the arrangement of FIG. 9 show alternatives to the decorrelation technique of FIGS. 2 and 7. In FIG. 8, respective decorrelator functions or devices ("Decorrelators") 46 and 48 are in the time domain, each following the respective Inverse Filterbank 30 and 36 in their channel. In FIG. 9, respective decorrelator functions or devices ("Decorrelators") 50 and 52 are in the frequency domain, each preceding the respective Inverse Filterbank 30 and 36 in their channel. In both the FIG. 8 and FIG. 9 arrangements, each of the Decorrelators (46, 48, 50, 52) has a unique characteristic so that their outputs are mutually decorrelated with respect to each other. The Decorrelation Scale Factor may be used to control, for example, the ratio of decorrelated to uncorrelated signal provided in each channel Optionally, the Transient Flag may also be used to shift the mode of operation of the Decorrelator, as is explained below. In both the FIG. 8 and FIG. 9 arrangements, each Decorrelator may be a Schroeder-type reverberator having its own unique filter characteristic, in which the amount or degree of reverberation is controlled by the decorrelation scale factor (implemented, for example, by controlling the degree to which the Decorrelator output forms a part of a linear combination of the Decorrelator input and output). Alternatively, other controllable decorrelation techniques may be employed either alone or in combination with each other or with a Schroeder-type reverberator. Schroeder-type reverberators are well known and may trace their origin to two journal papers: "'Colorless' Artificial Reverberation" by M. R. Schroeder and B. F. Logan, *IRE Transactions on Audio*, vol. AU-9, pp. 209-214, 1961 and "Natural Sounding Artificial Reverberation" by M. R. Schroeder, *Journal A.E.S.*, July 1962, vol. 10, no. 2, pp. 219-223.

When the Decorrelators 46 and 48 operate in the time domain, as in the FIG. 8 arrangement, a single (i.e., wideband) Decorrelation Scale Factor is required. This may be obtained by any of several ways. For example, only a single Decorrelation Scale Factor may be generated in the encoder of FIG. 1 or FIG. 7. Alternatively, if the encoder of FIG. 1 or FIG. 7 generates Decorrelation Scale Factors on a subband basis, the Subband Decorrelation Scale Factors may be amplitude or power summed in the encoder of FIG. 1 or FIG. 7 or in the decoder of FIG. 8.

When the Decorrelators 50 and 52 operate in the frequency domain, as in the FIG. 9 arrangement, they may receive a decorrelation scale factor for each subband or groups of subbands and, concomitantly, provide a commensurate degree of decorrelation for such subbands or groups of subbands.

The Decorrelators 46 and 48 of FIG. 8 and the Decorrelators 50 and 52 of FIG. 9 may optionally receive the Transient Flag. In the time-domain Decorrelators of FIG. 8, the Transient Flag may be employed to shift the mode of operation of the respective Decorrelator. For example, the Decorrelator may operate as a Schroeder-type reverberator in the absence of the transient flag but upon its receipt and for a short subsequent time period, say 1 to 10 milliseconds, operate as a fixed delay. Each channel may have a predetermined fixed delay or the delay may be varied in response to a plurality of transients within a short time period. In the frequency-domain Decorrelators of FIG. 9, the transient flag may also be employed to shift the mode of operation of the respective Decorrelator. However, in this case, the receipt of a transient flag may, for example, trigger a short (several milliseconds) increase in amplitude in the channel in which the flag occurred.

In both the FIGS. 8 and 9 arrangements, an Interpolator 27 (33), controlled by the optional Transient Flag, may provide interpolation across frequency of the phase angles output of Rotate Angle 28 (33) in a manner as described above.

As mentioned above, when two or more channels are sent in addition to sidechain information, it may be acceptable to reduce the number of sidechain parameters. For example, it may be acceptable to send only the Amplitude Scale Factor, in which case the decorrelation and angle devices or functions in the decoder may be omitted (in that case, FIGS. 7, 8 and 9 reduce to the same arrangement).

Alternatively, only the amplitude scale factor, the Decorrelation Scale Factor, and, optionally, the Transient Flag may be sent. In that case, any of the FIG. 7, 8 or 9 arrangements may be employed (omitting the Rotate Angle 28 and 34 in each of them).

As another alternative, only the amplitude scale factor and the angle control parameter may be sent. In that case, any of the FIG. 7, 8 or 9 arrangements may be employed (omitting the Decorrelator 38 and 42 of FIG. 7 and 46, 48, 50, 52 of FIGS. 8 and 9).

As in FIGS. 1 and 2, the arrangements of FIGS. 6-9 are intended to show any number of input and output channels although, for simplicity in presentation, only two channels are shown.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed herein.

The invention claimed is:

1. A method performed in an audio decoder for reconstructing N audio channels from an audio signal having M audio channels, the method comprising:

receiving a bitstream containing the M audio channels and a set of spatial parameters, wherein the set of spatial parameters includes an amplitude parameter, a correlation parameter, wherein the amplitude parameter is differentially encoded across frequency;

decoding the M encoded audio channels, wherein each audio channel is divided into a plurality of frequency bands, and each frequency band includes one or more spectral components;

extracting the set of spatial parameters from the bitstream;

applying a differential decoding process across frequency to the differentially encoded amplitude parameter to obtain a differentially decoded amplitude parameter;

analyzing the M audio channels to detect a location of a transient, wherein the location of the transient is detected based on a filtering operation;

decorrelating the M audio channels to obtain a decorrelated version of the M audio channels, wherein a first decorrelation technique is applied to a first subset of the plurality of frequency bands of each audio channel and a second decorrelation technique is applied to a second subset of the plurality of frequency bands of each audio channel;

deriving N audio channels from the M audio channels, the decorrelated version of the M audio channels, and the set of spatial parameters, wherein N is two or more, M is one or more, and M is less than N; and synthesizing, by an audio reproduction device, the N audio channels as an output audio signal, wherein both the analyzing and the decorrelating are performed in a frequency domain, the first decorrelation technique represents a first mode of operation of a decorrelator, the second decorrelation technique represents a second mode of operation of the decorrelator, and the audio decoder is implemented at least in part in hardware.

2. The method of claim 1, wherein the first mode of operation uses an all-pass filter and the second mode of operation uses a fixed delay.

3. The method of claim 1, wherein the analyzing occurs after the extracting and the deriving occurs after the decorrelating.

4. The method of claim 1, wherein the first subset of the plurality of frequency bands is at a higher frequency than the second subset of the plurality of frequency bands.

5. The method of claim 1, wherein the M audio channels are a sum of the N audio channels.

6. The method of claim 1, wherein the location of the transient is used in the decorrelating to process bands with a transient differently than bands without a transient.

7. The method of claim 6, wherein the N audio channels represent a stereo audio signal where N is two and M is one.

8. The method of claim 1, wherein the N audio channels represent a stereo audio signal where N is two and M is one.

9. The method of claim 1, wherein the first subset of the plurality of frequency bands is non-overlapping but contiguous with the second subset of the plurality of frequency bands.

10. A non-transitory computer readable medium containing instructions that when executed by a processor perform the method of claim 1.

11. An audio decoder for decoding M encoded audio channels representing N audio channels, the audio decoder comprising:

an input interface for receiving a bitstream containing the M encoded audio channels and a set of spatial parameters, wherein the set of spatial parameters includes an amplitude parameter, a correlation parameter, wherein the amplitude parameter is differentially encoded across frequency;

an audio decoder for decoding the M encoded audio channels, wherein each audio channel is divided into a plurality of frequency bands, and each frequency band includes one or more spectral components;

a demultiplexer for extracting the set of spatial parameters from the bitstream;

a processor for applying a differential decoding process across frequency to the differentially encoded amplitude parameter to obtain a differentially decoded amplitude parameter, and analyzing the M audio channels to detect a location of a transient, wherein the location of the transient is detected based on a filtering operation;

a decorrelator for decorrelating the M audio channels, wherein a first decorrelation technique is applied to a first subset of the plurality of frequency bands of each audio channel and a second decorrelation technique is applied to a second subset of the plurality of frequency bands of each audio channel;

a reconstructor for deriving N audio channels from the M audio channels and the set of spatial parameters, wherein N is two or more, M is one or more, and M is less than N; and an audio reproduction device that synthesizes the N audio channels as an output audio signal, wherein both the analyzing and the decorrelating are performed in a frequency domain, the first decorrelation technique represents a first mode of operation of a decorrelator, and the second decorrelation technique represents a second mode of operation of the decorrelator.

* * * * *